US012155739B2

(12) United States Patent
Wang et al.

(10) Patent No.: US 12,155,739 B2
(45) **Date of Patent: *Nov. 26, 2024**

(54) EFFICIENT RESOURCE REPRESENTATION EXCHANGE BETWEEN SERVICE LAYERS

(71) Applicant: Convida Wireless, LLC, Wilmington, DE (US)

(72) Inventors: Chonggang Wang, Princeton, NJ (US); Dale N. Seed, Allentown, PA (US); Quang Ly, North Wales, PA (US); Xu Li, Plainsboro, NJ (US); Lu Liu, Conshohocken, PA (US); Catalina Mihaela Mladin, Hatboro, PA (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/461,932

(22) Filed: Sep. 6, 2023

(65) Prior Publication Data

US 2023/0421663 A1 Dec. 28, 2023

Related U.S. Application Data

(63) Continuation of application No. 17/258,211, filed as application No. PCT/US2019/037496 on Jun. 17, 2019, now Pat. No. 11,792,298.

(Continued)

(51) Int. Cl.

| | |
|---|---|
| ***H04L 12/70*** | (2013.01) |
| ***H04L 47/76*** | (2022.01) |
| ***H04L 67/60*** | (2022.01) |

(52) U.S. Cl.

CPC .............. *H04L 67/60* (2022.05); *H04L 47/76* (2013.01)

(58) Field of Classification Search

CPC ..... H04L 67/60; H04L 47/76; H04L 67/5651; H04L 67/12; H04L 69/04; Y02D 30/70; H04W 4/18; H04W 4/70

(Continued)

(56) References Cited

U.S. PATENT DOCUMENTS

| | | | | |
|---|---|---|---|---|
| 11,792,298 | B2 * | 10/2023 | Wang | H04L 67/60 |
| 2013/0198340 | A1 * | 8/2013 | Ukkola | H04L 67/12 709/219 |

(Continued)

FOREIGN PATENT DOCUMENTS

| | | | | |
|---|---|---|---|---|
| CN | 106537841 A | | 3/2017 | |
| WO | WO-2015143086 A1 | * | 9/2015 | H04L 41/0803 |
| WO | WO-2016077523 A1 | * | 5/2016 | H04L 61/3085 |

OTHER PUBLICATIONS

Taleb et al., "An efficient scheme for MTC overload control based on signaling message compression", 2013 IEEE Global Communications Conference (Globecom), IEEE, (Dec. 9, 2013), pp. 342-346.

*Primary Examiner* — Moustafa M Meky
*Assistant Examiner* — Elizabeth Kassa
(74) *Attorney, Agent, or Firm* — BakerHostetler

(57) ABSTRACT

Some underlying networks such as Low-Power Wide-Area Networks (LPWAN) have limited communication bandwidth and strict requirements on maximum message size. These requirements may pose a challenge for data or resource exchange between two service layer (SL) entities, for example, because resource representations to be exchanged may have too large a size to be supported by the underlying networks. In some cases, traditional data compression algorithms can be used to alleviate this problem to some degree, but it is recognized herein that there are associated computation costs due to compression and decompression that may not be affordable for constrained IoT devices. Various embodiments described herein address (Continued)

this problem, among others by defining a Resource Representation Common Part (RRCP) and storing it at the service layer. In some cases, the RRCP is not transmitted between SL entities, thereby reducing SL message sizes to cater to the constraints of underlying networks.

20 Claims, 36 Drawing Sheets

Related U.S. Application Data

(60) Provisional application No. 62/694,580, filed on Jul. 6, 2018.

(58) Field of Classification Search
USPC .......................................................... 709/226
See application file for complete search history.

(56) References Cited

U.S. PATENT DOCUMENTS

2016/0142937 A1* 5/2016 Balasubramanian ........................ H04W 28/06 370/328
2016/0191295 A1* 6/2016 Dong .................. G06F 16/9558 707/741
2019/0005024 A1* 1/2019 Somech .................. H04L 67/14
2023/0421663 A1* 12/2023 Wang ...................... H04L 47/76

* cited by examiner

EFFICIENT RESOURCE REPRESENTATION EXCHANGE BETWEEN SERVICE LAYERS

CROSS-REFERENCE TO RELATED APPLICATIONS

This application is a continuation of U.S. application Ser. No. 17/258,211, filed Jan. 6, 2021, which is the National Stage of International Patent Application No. PCT/US2019/037496, filed Jun. 17, 2019, which claims the benefit of U.S. Provisional Patent Application No. 62/694,580, filed Jul. 6, 2018, which are hereby incorporated by reference in their entirety.

BACKGROUND

The oneM2M standard defines a Service Layer called "Common Service Entity (CSE)". The purpose of the Service Layer is to provide "horizontal" services that can be utilized by different "vertical" M2M systems and applications. The CSE supports four reference points as shown in FIG. 1. The Mca reference point interfaces with the Application Entity (AE). The Mcc reference point interfaces with another CSE within the same service provider domain and the Mcc' reference point interfaces with another CSE in a different service provider domain. The Mcn reference point interfaces with the underlying network service entity (NSE). An NSE provides underlying network services to the CSEs, such as device management, location services and device triggering. A CSE contains multiple logical functions called "Common Service Functions (CSFs)", such as "Discovery" and "Data Management & Repository".

The oneM2M architecture enables the following types of Nodes, as shown in FIG. 1: an Application Service Node, an Application Dedicated Node, a Middle Node, an Infrastructure Node, and a Non-oneM2M Node.

An Application Service Node (ASN) is a node that contains one CSE and contains at least one Application Entity (AE). As an example of a physical mapping, an ASN could reside in an M2M Device.

An Application Dedicated Node (ADN) is a node that contains at least one AE and does not contain a CSE. There may be zero or more ADNs in the Field Domain of the oneM2M System. As an example of a physical mapping, an ADN could reside in a constrained M2M device.

A Middle Node (MN) is a node that contains one CSE and contains zero or more AEs. There may be zero or more MNs in the Field Domain of the oneM2M System. As an example of physical mapping, a MN could reside in an M2M Gateway.

An Infrastructure Node (IN) is a node that contains one CSE and contains zero or more AEs. There is exactly one IN in the Infrastructure Domain per oneM2M Service Provider. A CSE in an IN may contain CSE functions not applicable to other node types. As an example of a physical mapping, an IN could reside in an M2M Service Infrastructure.

A Non-oneM2M Node (NoDN) is a node that does not contain oneM2M Entities (neither AEs nor CSEs). Such nodes represent devices attached to the oneM2M system for interworking purposes, including management.

In oneM2M, the request/response model is adopted for its Mca, Mcc, and Mcc' reference points. For example, an AE can send a request message to a CSE to access its resources or services.

SUMMARY

To support different underlying networks and various vertical applications in Internet of Things (IoT) systems, Service Layers (SLs) have been proposed (e.g., oneM2M), where a suite of common services is defined as a middleware between applications and underlying networks. Some underlying networks such as Low-Power Wide-Area Networks (LPWAN) usually have limited communication bandwidth and strict requirements on maximum message size. It is recognized herein that these requirements may pose a challenge for data or resource exchange between two SL entities, for example, because resource representations to be exchanged may have too large a size to be supported by the underlying networks. In some cases, traditional data compression algorithms can be used to alleviate this problem to some degree, but it is recognized herein that there are associated computation costs due to compression and decompression that may not be affordable for constrained IoT devices. Various embodiments described herein address this problem, among others, by defining a Resource Representation Common Part (RRCP) and storing it at the service layer. In some cases, the RRCP is not transmitted between SL entities, thereby reducing SL message sizes to cater to the constraints of underlying networks.

According to one aspect, a network apparatus implements a service layer, and stores one or more attributes of one or more resources, so as to define a resource representation common part (RRCP). The apparatus receives, from a device a communications network, a request message comprising information, an identifier associated with the RRCP, and a message request template identifier. The apparatus may retrieve, from its memory in response to the request message from the device, the RRCP associated with the identifier, and one or more request parameters having an associated message template identifier that matches the message template identifier in the message received from the device. The apparatus may combine the RRCP and the one or more request parameters with the information in the received request message to recover a regular request message, and process the regular request message. For example, the apparatus may create or update one or more attributes of a target resource in accordance with the one or more attributes of the RRCP.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings.

DETAILED DESCRIPTION OF ILLUSTRATIVE EMBODIMENTS

Figure 1:
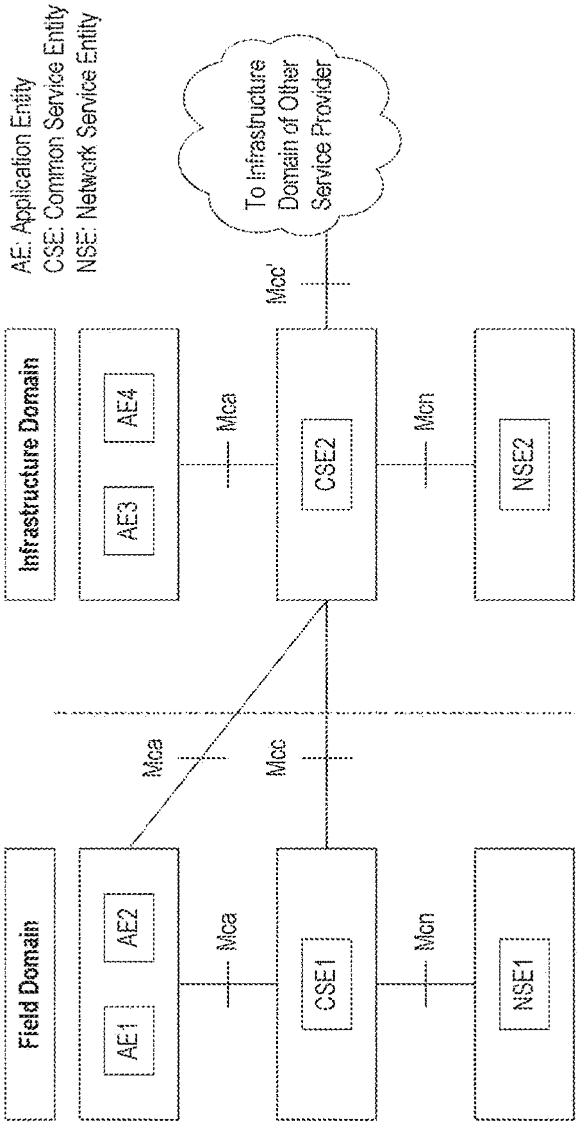
FIG. 1 is a diagram illustrating the network architecture specified by oneM2M.
Figure 2:
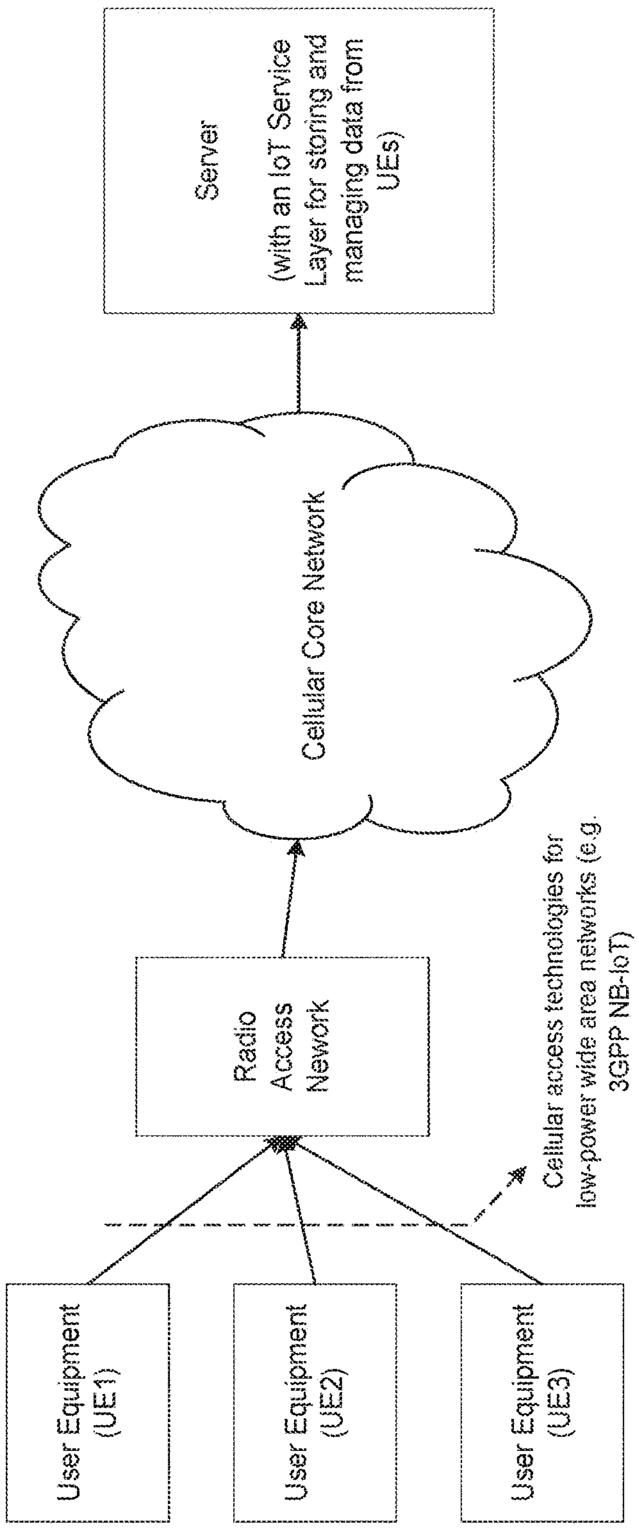
FIG. 2 illustrates a smart metering use case, where each smart meter, as a User Equipment (UE), uses low-power wide-area access technologies such as 3GPP Narrow Band Internet of Things (NB-IoT) to communicate with a server.

To better understand the technical problem to which the technical solution described herein is addressed, a use case is presented for illustration. FIG. 2 illustrates a smart metering use case, where each smart meter, as a User Equipment (UE), uses low-power wide-area access technologies such as 3GPP Narrow-Band Internet of Things (NB-IoT) to communicate with a server where an IoT service layer resides for storing and managing meter data from various UEs; the Server could be deployed by an electricity company. For example, there could be a smart meter application running on each UE to periodically send meter readings to the Server.

Figure 3:
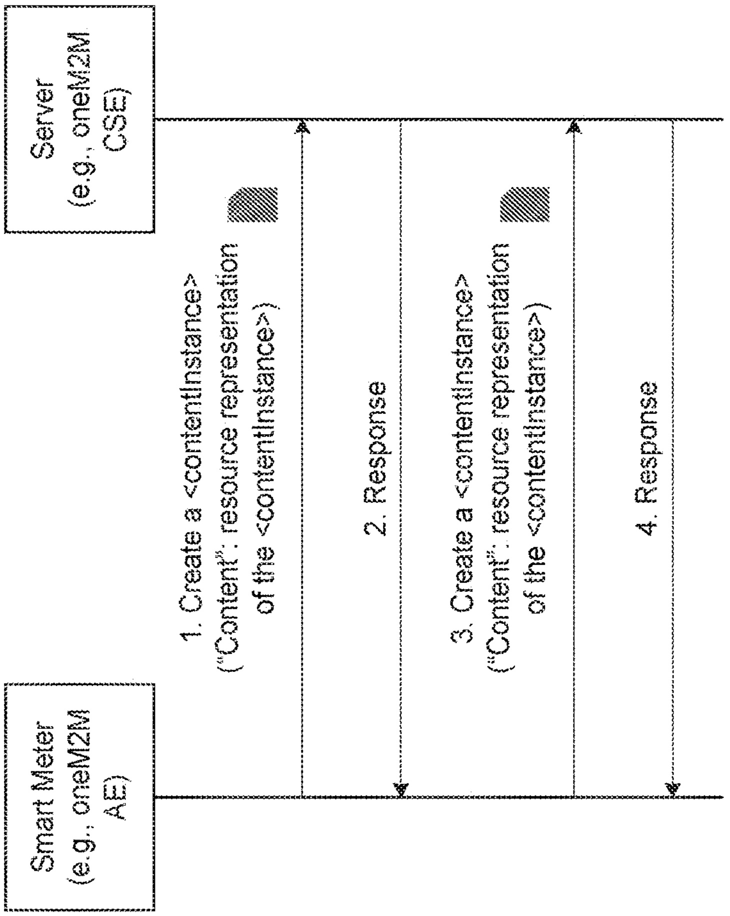
FIG. 3 shows an example of repeated resource creation.
Figure 4:
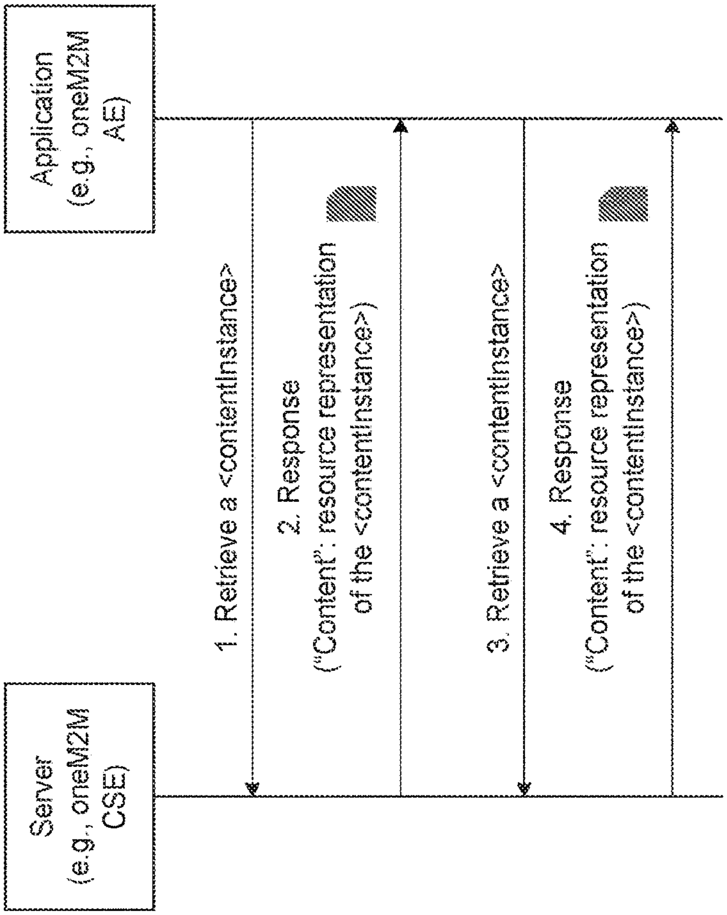
FIG. 4 shows an example of repeated resource retrieval.

In the context of an example oneM2M architecture, each smart meter, in some cases, may need to repeatedly create a <contentInstance> at the server as illustrated in FIG. 3 by way of example. To do this, the attributes of a <contentInstance> resource (e.g., listed in Table 1 below) may be transmitted from the smart meter to the server for each create operation (e.g., Step 1 and Step 3 in FIG. 3). The attributes labelled with a star symbol in Table 1 may be the same in different create operations from the same smart meter or from different smart meters. In an example, once <contentInstance> resources have been created at the server for storing meter readings, an application can retrieve the readings from the server as depicted in FIG. 4, where the representation of the retrieved <contentInstance> including its attributes may be transmitted from the server to the application. The application may reside on a given UE.

Thus, it is recognized herein that the <contentInstance> resource representation (e.g., attributes of a <contentInstance> resource) may be transmitted from smart meters to the server, which may create a challenging burden for LPWAN air interface because, for example, LPWAN technologies may have limited communication bandwidth and short link layer message sizes.

TABLE 1

Example Attributes of oneM2M <contentInstance> Resource

| Attributes of <contentInstance> | RW/RO/WO |
|---|---|
| resourceType* | RO |
| resourceID | RO |
| resourceName | WO |
| parentID* | RO |
| labels* | WO |
| expirationTime* | WO |
| creationTime | RO |
| lastModifiedTime | RO |
| stateTag | RO |
| announceTo* | WO |
| announcedAttribute* | WO |
| creator* | RO |
| contentInfo* | WO |
| contentSize* | RO |
| contentRef* | WO |
| ontologyRef* | WO |
| content | WO |

As illustrated by the example smart meter use case described above, it is recognized herein that the resource representation of a <contentInstance>, due to the inclusion of too many attributes, may present an overhead issue for an LPWAN air interface, especially because those attributes may be the same for different <contentInstance> resources. Thus, when creating/updating/retrieving an IoT resource, its resource representation to be transmitted between the originator and the recipient might have too large of a size to be easily supported by constrained underlying networks, such as LPWAN, which may have limited communication bandwidth and may accommodate small link layer message size. It is recognized herein that IoT resources can be more effectively and efficiently manipulated via constrained underlying networks.

To support different underlying networks and various vertical applications in Internet of Things (IoT) systems, Service Layers (SLs) have been proposed (e.g., oneM2M), where a suite of common services is defined as a middleware between applications and underlying networks. Some underlying networks such as Low-Power Wide-Area Networks (LPWAN) usually have limited communication bandwidth and strict requirements on maximum message size. It is recognized herein that these requirements may pose a challenge for data or resource exchange between two SL entities, for example, because resource representations to be exchanged may have too large a size to be supported by the underlying networks. In some cases, traditional data compression algorithms can be used to alleviate this problem to some degree, but it is recognized herein that there are associated computation costs due to compression and decompression that may not be affordable for constrained IoT devices. Various embodiments described herein address this problem, among others, by defining a Resource Representation Common Part (RRCP) and storing it at the service layer. In some cases, the RRCP is not transmitted it between SL entities, thereby reducing SL message sizes to cater to the constraints of underlying networks. The following terms will be used for developing new methods in this disclosure.

Before proceeding with the technical solution to the problems illustrated by the foregoing use case, certain terms are defined for ease of description only. The following terms have the following meanings:

A Service Layer may be described as a protocol layer between applications and application protocol layers. A service layer stores resources and provides services, which are exposed to and can be accessed and manipulated by applications and other service layers.

A Request/Response Model may be an interaction model between a service layer and an application (or between two service layers). In this model, the application (or another service layer) sends a request message to the service layer, which in turn sends a response message back to the application (or another service layer).

A Response Message may be a message sent from the service layer to an application (or another service layer) as a result of receiving and processing a request message. A response message could be also issued from an application to a service layer.

A Request Message may be a message sent from an application (or another service layer) to a service layer to request services provided by the service layer. The service layer processes a received request message and will sends a response message to the originator of the request message. A request message could be also issued from a service layer to another application.

Resources may refer to any information, data, and/or digital objects stored at the service layer. Each resource may have some attributes that describe resource properties. A resource representation may refer to the content of a resource, including its attributes and their values.

As used herein, unless otherwise specified, a regular resource refers to a resource natively defined and supported in a service layer. For example, <container> is a regular resource as defined in the oneM2M service layer. As used herein, resource and regular resource are interchangeably used, without limitation, unless otherwise specified. As used herein, the Resource Representation Common Part (RRCP) refers to a special resource (e.g., not a regular resource) used to contain some attributes and their associated values, which can be commonly used/shared by one or more regular resources. These attributes are referred to as common attributes. Taking oneM2M as an example, in some cases, any oneM2M universal, common, and resource specific attributes may be included in a given RRCP as RRCP's common attributes. As used herein, unless otherwise specified, a Regular Request refers to a request message natively defined and supported in a service layer. The regular request may be used to contain a set of request parameters as specified by the service layer, and a resource representation for CREATE/UPDATE operations. A regular request does not leverage any resource representation common part. As used herein, unless otherwise specified, an Optimized Request refers to a request message enhanced by leveraging RRCPs, in accordance with various embodiments. In general, an optimized request is formulated at the requestor side by containing a resource representation common part and removing those common attributes that are included in the resource representation common part. Thus, the optimized request may be shorter than the regular request. A Regular Response refers to a response message natively defined and supported in a service layer. The regular response is used to contain a set of response parameters as specified by the service layer and a resource representation for RETRIEVE operation. A regular response does not leverage any resource representation common part stored at the requestor side. As used herein, an Optimized Response refers to a response message enhanced by leveraging a resource representation common part, in accordance with various embodiments. In general, an optimized response may be formulated at the recipient service layer side by containing a resource representation common part identifier and removing those common attributes that are included in the resource representation common part. Thus, the optimized response may be shorter than the regular response.

In various examples, as described in detail herein, the Resource Representation Common Part (RRCP) may reduce SL messaging overhead between a SL originator and a SL recipient, thereby enabling efficient resource representation exchange between them. A given RRCP may consist of some common attributes of one or more regular resources, which may have static values and/or may be constantly repeated in consecutive resource operations (e.g., create/retrieve/update a regular resource). An SL recipient may maintain some RRCPs for different resources or resource types. In an example, when an originator requests to create/update a new regular resource at the SL, it does not need to transmit the whole resource representation, but may only transmit a part of the original resource representation, and indicate the identifier of RRCPs (i.e., rrcpID) to the SL, which may then use the attributes contained in the RRCPs to recover the original resource representation. Thus, the message size from the originator to the SL may be greatly reduced given the fact that the size of rrcpID is shorter than those attributes contained in the corresponding RRCPs. In some cases, the originator may indicate multiple rrcpIDs in its request message. Similarly, when an originator requests to retrieve a new resource, the SL recipient may have already instructed the originator to locally store some RRCPs, and therefore may only need to send a list of rrcpIDs and a part of the original resource representation in the response message back to the originator. Then, the originator may use rrcpIDs to get the locally stored RRPCs and accordingly obtain the whole resource representation. In this way, for example, the response message from the SL recipient to the originator may be reduced.

The RRCP is now described in further detail for efficient resource representation exchange for SLs. The RRCP is defined as a set of attributes including their values, which may be used by regular resources and may partially represent a regular resource. The RRCP can be used to optimize a request or a response if it contains a resource representation. In some cases, the value of those attributes is static or will not change too often. A regular resource with multiple attributes may have or use one or more RRCPs and each RRCP may contain one or more attributes. A RRCP may be defined for and used by multiple regular resources, for example, if they have some common attributes with identical values. Several examples of RRCPs are illustrated in FIGS. 5A-C.

Figure 5A:
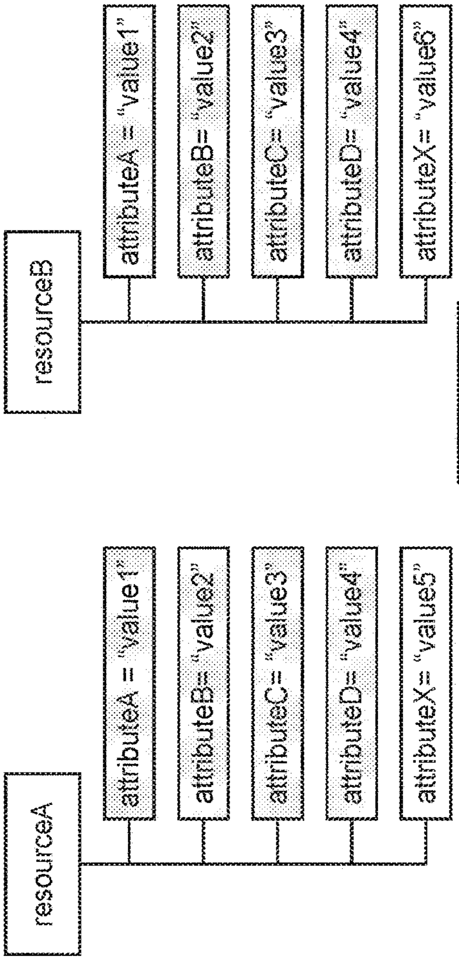
FIG. 5A depicts an example of two resources storing attributes without using a resource representation common part (RRCP) disclosed herein.
Figure 5B:
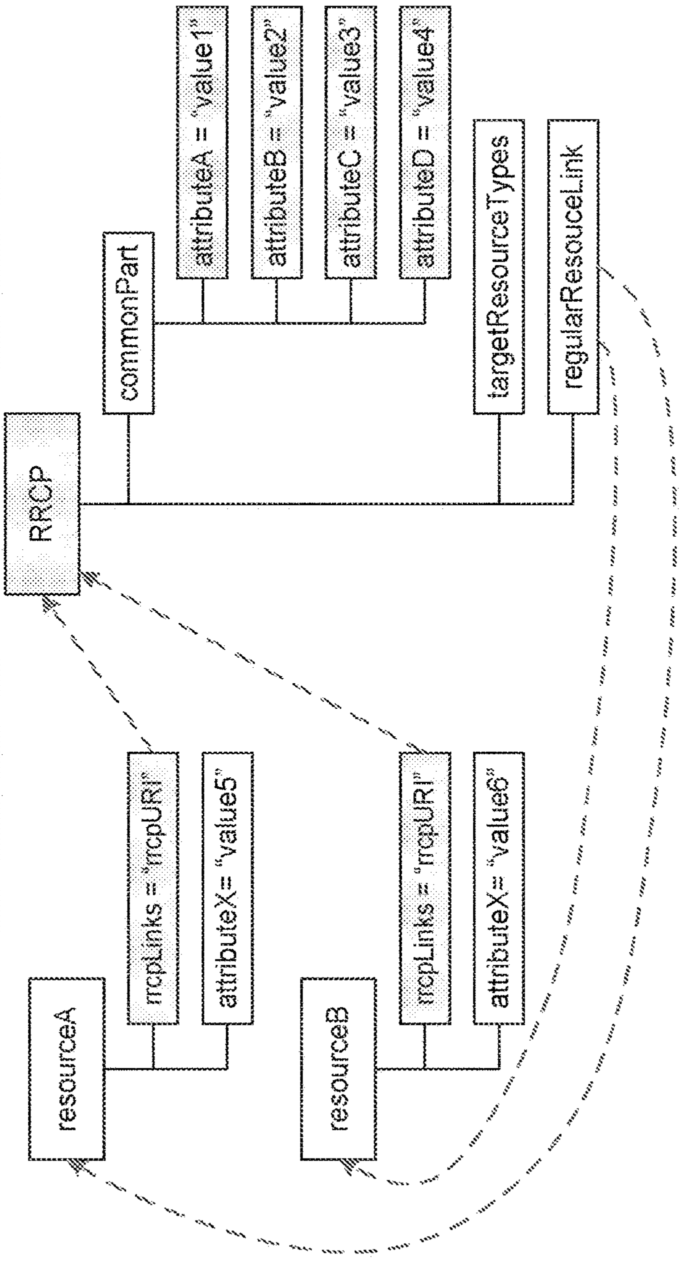
FIG. 5B depicts an example of two resources storing attributes with a RRCP.

Referring to FIG. 5A, regular resources resourceA and resourceB are shown. Each has five attributes and the value of first four attributes is the same for both resources. But there is no RRCP defined for both resources. As such, in accordance with the example, either resourceA or resourceB needs to store all five attributes separately. Referring to FIG. 5B, a RRCP is defined as a special resource to contain the four attributes that resourceA and resourceB commonly have. Given the RRCP, the regular resources resourceA and resourceB do not need to maintain those four common attributes separately, but each adds and uses a new attribute rrcpLinks to point to the special RRCP resource. The RRCP resource may also have an attribute regularResourceLink to reversely point to the regular resources that use the RRCP. The RRCP may also have some other attributes to describe how the RRCP may be used. For example, targetResourceTypes may be used to define the type of regular resources for which the RRCP can be used. With the introduction of RRCP, in some cases, common attributes among multiple regular resources will not need to be repeatedly stored separately. In this example, the RRCP only contains four attributes that have the same value for both resourceA and resourceB, it will be understood that a given RRCP can additionally contain other attributes of resourceA or resourceB.

Figure 5C:
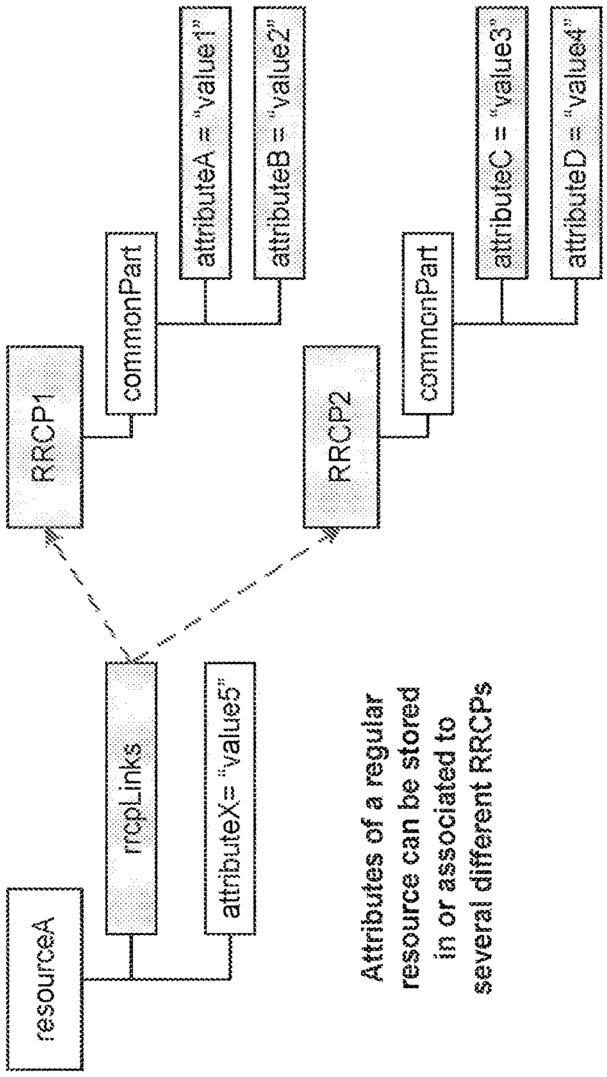
FIG. 5C depicts examples of a RRCP.

Referring to FIG. 5C, the regular resourceA uses two RRCPs (RRCP1 for its attributeA and attributeB, RRCP2 for its attributeC and attributeD), which may provide a finer granularity and better flexibility. In some cases, RRCP1 and RRCP2 may overlap and contain one or more identical attributes. In addition, a RRCP may have an optional attribute, implicitRights. For example, when the value of this attribute is set to TRUE (or 1), it may imply that any originator that uses the RRCP to create a regular resource may be automatically given the right to update the RRCP. In some cases, a given RRCP may have other RRCPs as its child resources and may automatically inherit attributes contained in other RRCPs.

Turning now to example architectures for efficient resource representation exchange, in one example, resource representation exchange is optimized during creating/updating a regular resource. In another example, representation exchange is improved during retrieving a regular resource. The RRCP may be leveraged to avoid directly transmitting a full resource representation of a regular resource between an SL originator and an SL recipient.

Figure 6:
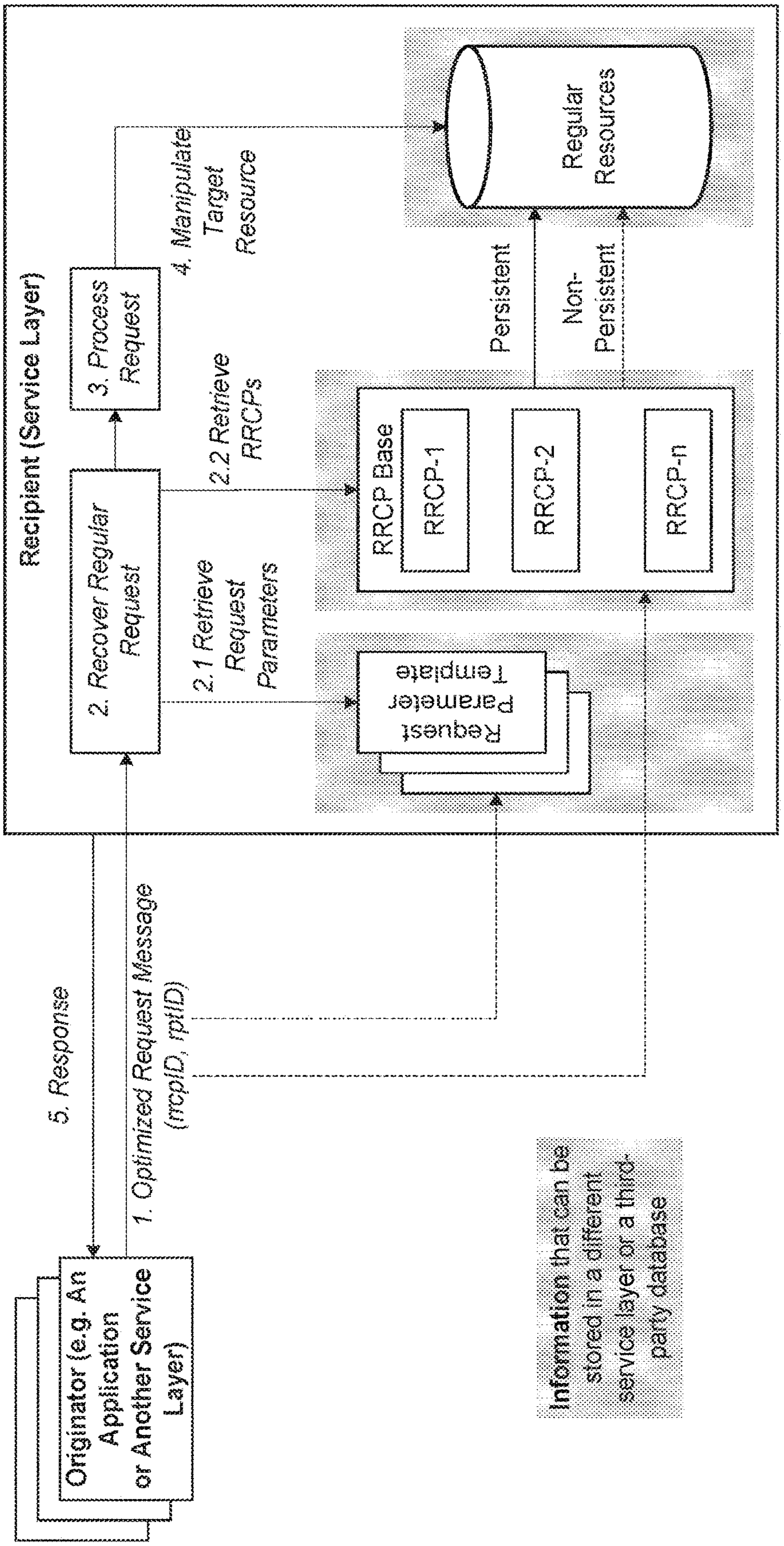
FIG. 6 illustrates an example architecture for efficient resource representation exchange for creating/updating a regular resource, in accordance with an example embodiment.

Referring to FIG. 6, an example architecture for efficient resource representation exchange for creating/updating a regular resource is shown. In this case, the SL recipient may maintain some RRCPs, which can be used or referred to by the SL originator when creating/updating a regular resource at the recipient. As such, the originator, in some cases, does not send the full resource representation of the regular resource to the recipient, but includes the identifier of a corresponding RRCP. The following new features or steps are proposed.

Still referring to FIG. 6, at 1, in accordance with the example, the originator generates a regular request message, which contains request parameters and the required attributes of the resource to be created or updated. To reduce the size of the regular request message, the originator may leverage rrcpID and rptID to generate a new optimized request message. The rrcpID indicates one or multiple RRCPs stored at the recipient, while rptID indicates one or multiple request parameter templates (or request message templates) that are also maintained at the recipient. The optimized request message may use rrcpID and rptID to replace a lengthy resource representation or a long list of request parameters. By way of example, the originator may have been configured with some rrcpID/rptID or may have discovered them from the recipient or other SLs. Then, the originator sends the optimized request message to the recipient.

At 2, in accordance with the illustrated example, the recipient receives the optimized request message and uses rrcpID to retrieve stored RRCPs, and uses rptID to retrieve maintained request parameters, to recover the original regular request. In some cases, the recipient inserts retrieved RRCPs and request parameters into optimized request message as received from the originator. In some examples, the RRCPs are stored in other SLs. In such an example, the recipient may need to retrieve them from other SLs using the rrcpID. At 3, in accordance with the illustrated example, the recipient processes the recovered regular request according to the recovered request parameters from request parameter templates (or request message templates). At 4, the recipient manipulates (e.g., create or update) the target resource according to the recovered attributes from corresponding RRCPs. Thus, a regular resource is created or updated. Since the regular resource is created or updated based on separate special resources RRCPs, the regular resource can also maintain certain relationships (e.g., persistent or non-persistent) with those RRCPs. If a persistent relationship is maintained between the regular resource and corresponding RRCPs, the regular resource is, in some cases, automatically notified and updated when RRCPs have been changed. Otherwise, in some cases, if the relationship is non-persistent, future changes to corresponding RRCPs do not automatically impact the regular resource. For non-persistent relationships, the regular resource may maintain its attributes by itself. In contrast, under persistent relationships, the regular resource might not need to maintain those common attributes contained in the corresponding RRCPs, as illustrated in FIG. 5B, to reduce the storage size. In either persistent or non-persistent relationships, the regular resource can have a new rrcpLinks to point to the corresponding RRCPs. Also, in either persistent or non-persistent relationships, the corresponding RRCPs may have a new regularResourceLink to point to the involved regular resources.

At 5, in accordance with the illustrated example, the recipient sends a response to the originator to indicate whether the resource operation as requested in Step 1 has been successfully performed. The recipient may also indicate to the originator whether the created/updated regular resource has a persistent or non-persistent relationship with the corresponding RRCPs. As an extension for the example shown in FIG. 6, there may be other SLs in the middle of the originator and the recipient. The SL in the middle may have multiple options to process the received optimized request message from the originator.

Figure 7:
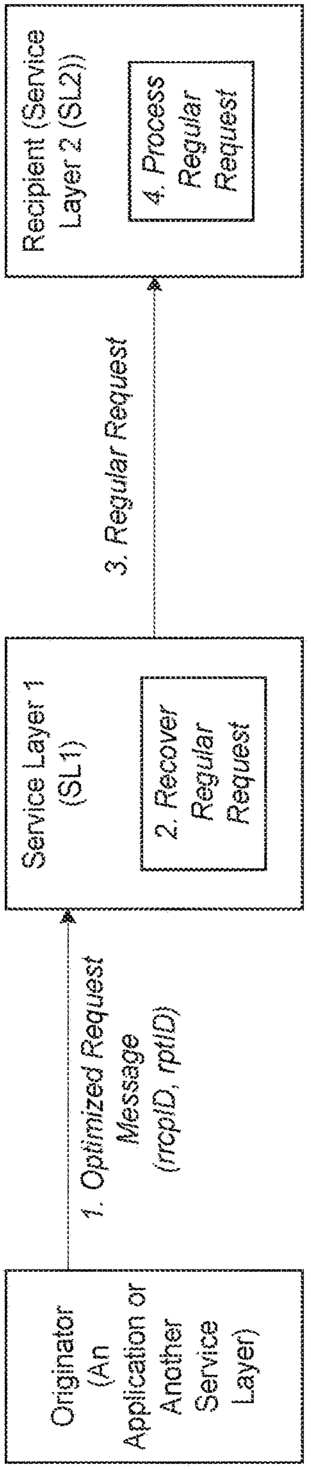
FIG. 7 illustrates an example efficient resource representation exchange for multi-hop scenarios, in accordance with an example embodiment.
Figure 8:
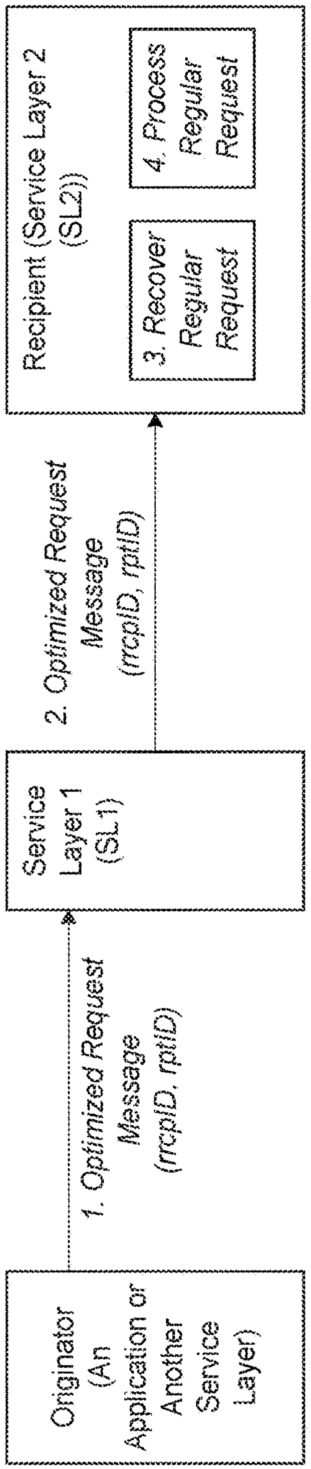
FIG. 8 illustrates another example efficient resource representation exchange for multi-hop scenarios, in accordance with another example embodiment.

In one option, shown in FIG. 7, after receiving the optimized request message from the originator, the SL in the middle (SL1) uses the same Step 2 in FIG. 6 to recover a regular request with request parameters and RRCP content being inserted. Then, SL1 forwards the regular request without any rrcpID or rptID to the recipient (SL2), which may process the regular request as normal without any impact from RRCPs. In a second option, shown in FIG. 8, after receiving the optimized request message from the originator, SL1 forwards the message to SL2. Then, SL2 may perform the same actions (e.g., to recover a regular request and to process the regular request) as the recipient in FIG. 6 does.

Figure 9:
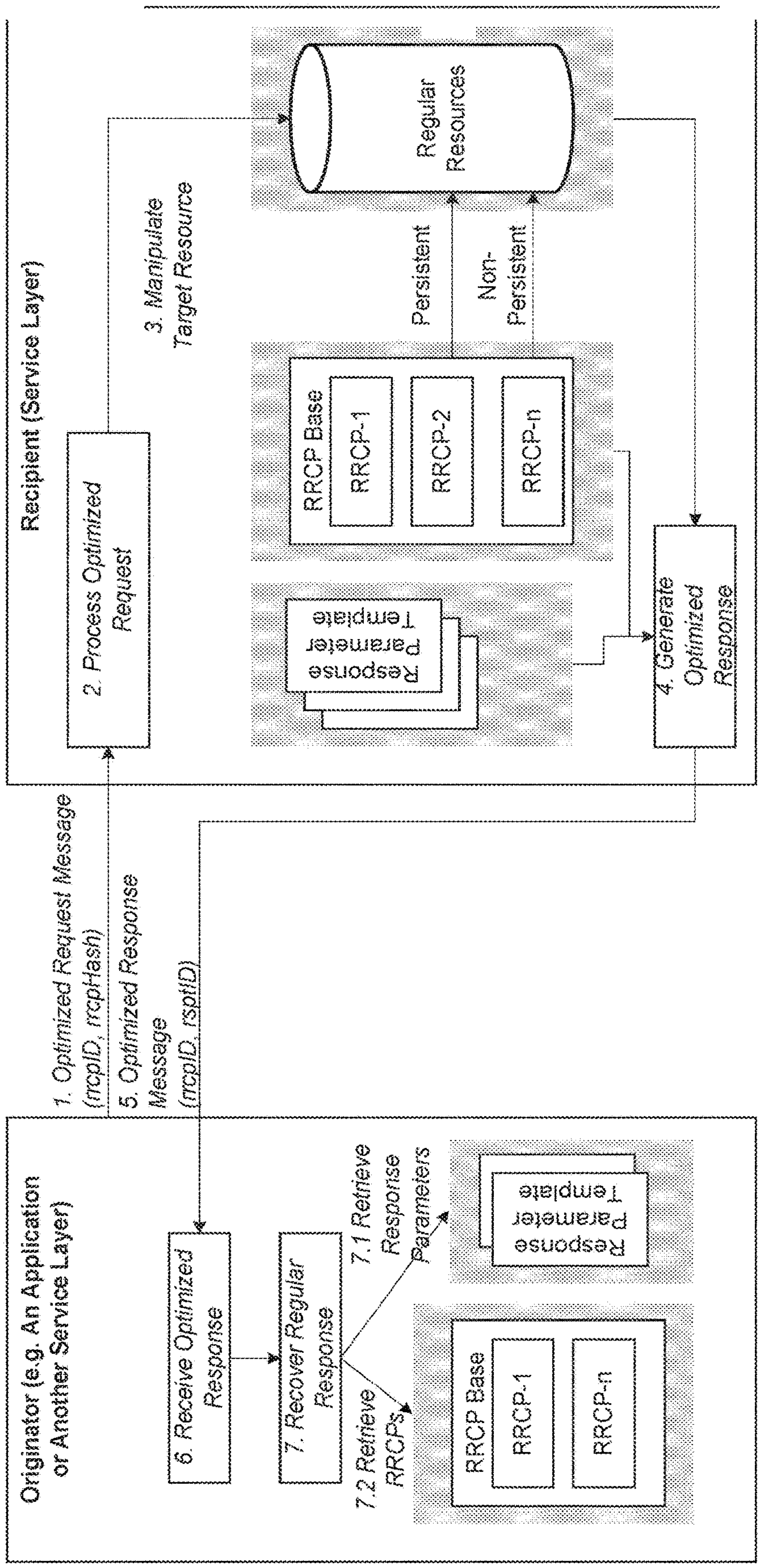
FIG. 9 illustrates an example architecture for efficient resource representation exchange for retrieving a regular resource, in accordance with an example embodiment.

Referring now to FIG. 9, an example architecture for efficient resource representation for retrieving a regular resource from an SL is shown. In this example, the SL originator may store some RRCPs locally, which can be leveraged or referred by the SL recipient when a regular resource is retrieved. As such, the recipient does not need to transmit the full resource representation of the retrieved regular resource to the originator, but instead may send the identifier of the regular resource.

At 1, in accordance with the illustrated example, the originator sends an optimized request message to the recipient to retrieve a regular target resource. This message contains one or more rrcpID to inform the recipient that the originator has maintained some RRCPs locally, which are related to the regular resource to be retrieved. In addition, this request message may also contain one (or more) rrcpHash that stands for the hash of a RRCP content. At 2, the recipient processes the received request message (e.g., access control check, rrcpID check, identify the target regular resource, etc.). At 3, the recipient checks the current resource representation of the target resource. In some cases, if the relationship between the target resource and rrcpIDs as indicated at 1 is persistent, the recipient may also check the content in each involved RRCPs to compare with rrcpHash as contained in Step 1, to determine if the content of each involved RRCP is the same or different from that maintained at the originator. If the RRCP content is different, the recipient may include the RRCP content in the response message to be generated in Step 4. Otherwise, in some cases, the recipient might only include the rrcpID in the response message. Additionally, the recipient may also check if any response parameter template or response message template (as denoted by rsptID) can be leveraged to shorten the response message furthermore. If so, the rsptID may be included in the optimized response message as well. At 4, based on the operations at 3, the recipient may generate an optimized response message, if the rrcpHash check at 3 is successful. In some cases, any rrcpID contained in the response message indicates that the corresponding RRCP maintained at the originator and the recipient is identical. At 5, the recipient sends the response message to the originator. At 6, the originator receives the response message. At 7, if the rsptID is included in the response message, the originator may first retrieve corresponding response parameters from the locally stored response parameter template or response message template as identified by rsptID, to recover the regular response message. Then, the originator may process the recovered response message to get the resource representation of the target resource, which may be the combination of each RRCP as indicated in the response message plus any additional attributes contained in the response message.

Figure 10:
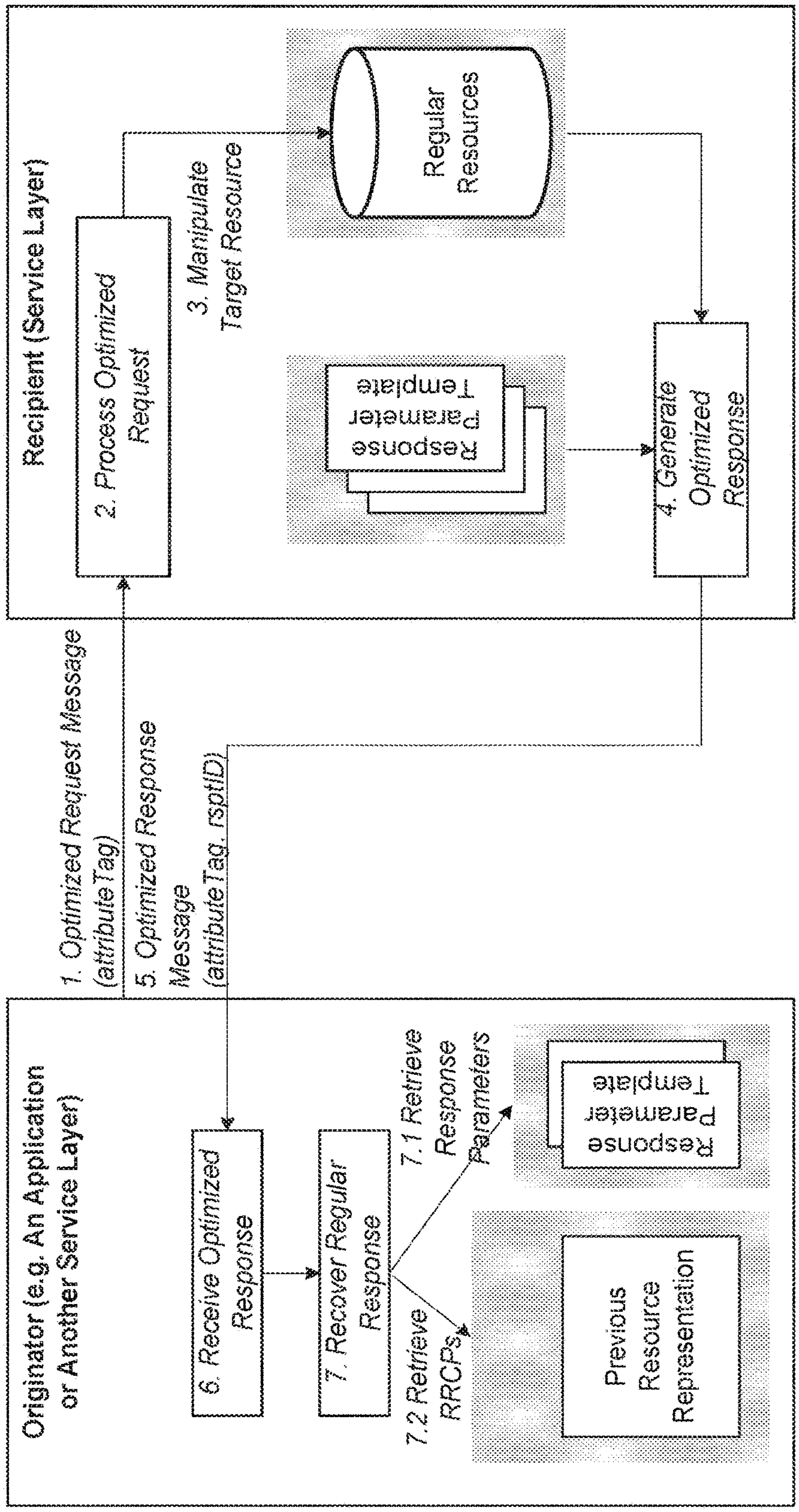
FIG. 10 illustrates an example architecture for efficient resource representation exchange for retrieving a regular resource, in accordance with another example embodiment.

Referring to FIG. 10, an alternative example is shown to optimize resource retrieval without using a RRCP. In this approach, it may be assumed that the originator has previously obtained the full resource representation of a regular resource. When it continues to retrieve the same regular resource, the originator can indicate to the recipient that only a subset of the resource attributes (e.g., those have been changed from last time, etc.) needs to be returned to the originator. Hence, the response message from the recipient to the originator is reduced.

In an example, a retrieve operation allows an Originator to retrieve only the attributes of a resource that have changed compared to the last time the Originator retrieved the resource. At 1, in accordance with the illustrated example, the originator sends an optimized request message to the recipient to retrieve a regular target resource. This message may contain an attributeTag to indicate certain conditions for retrieving a subset of target resource attributes. For example, if the attributeTag contains a last modified or retrieved time, the recipient might only return those attributes that have been changed since the last modified or retrieved time as indicated by the attributeTag. In addition, this request message may also contain one (or more) rrcpHash that stands for the hash of a RRCP content. At 2, the recipient processes the received request message (e.g., access control check, identify the target regular resource, etc.). At 3, the recipient may check each attribute of the target resource (e.g., to check the last modified time of each attribute). If an attribute has its last modified time as a time that is greater than the time contained in attributeTag, in some cases, the recipient contains the name and value of this attribute in the response message to be sent to the originator. Additionally, the recipient may also check if any response parameter template or response message template (as denoted by rsptID) can be leveraged to shorten the response message further. If so, the rsptID will be included in the optimized response message as well.

Still referring to FIG. 10, at 4, based on the operations at 3, the recipient generates an optimized response message that may contain a subset of target resource attributes, thereby having a smaller size. At 5, in accordance with the illustrated example, the recipient sends the response message to the originator. This message may contain rsptID and an updated attributeTag (e.g., the new last modified/retrieved time). At 6, the originator receives the response message. At 7, if rsptID is included in the response message, the originator may first retrieve corresponding response parameters from the locally stored response parameter template or response message template as identified by rsptID to recover the regular response message. Then, the originator may process the recovered response message to get the resource representation of the target resource (e.g., to use the attributes received from Step 6 to update the locally stored previous resource representation. Then, the originator may store the latest resource representation to overwrite the previous resource representation. In some cases, the parameter attributeTag at 1 may indicate other conditions or criteria (e.g., instead of last modified or retrieved time) for the recipient to select appropriate target resource attributes. For example, the attributeTag can indicate the number of changes since the last modified time.

In some cases, although RRCP is a special resource, it still can be manipulated using RESTful operations. For example, a new RRCP can be created and stored at a SL, which can be updated, retrieved, and deleted by its creator or other permissioned service layers or applications. In addition, a unique operation on a RRCP is to apply it to regular resources (i.e., use the common attributes as contained in RRCP to update regular resources, associate regular resources with RRCP, etc.).

Figure 11:
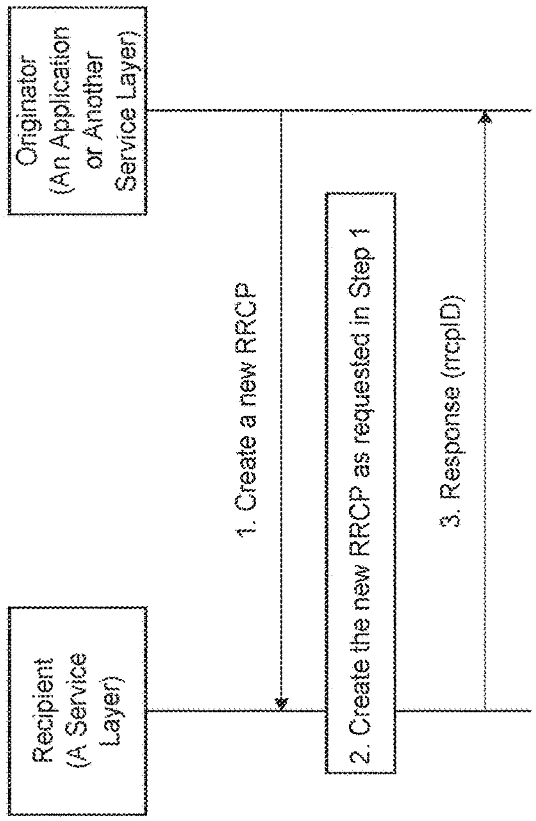
FIG. 11 is a call flow for creating a new RRCP, in accordance with an example embodiment.

Referring now to FIG. 11, an example procedure for creating a new RRCP is shown. At 1, in accordance with the illustrated example, an originator sends a request to a recipient, which contains the content of the RRCP (e.g., its attributes and associated values) to be created, for example the common attributes for other regular resources. Optionally, the originator may also contain an identifier of an existing regular resource in a parameter referenceResourceID. The recipient may use this resource as a reference resource to create the new RRCP. If the referenceResourceID is contained, for example, another parameter attributeList may be contained to indicate the list of attributes of the reference resource, which may be used to create the new RRCP.

At 2, the recipient receives the request and creates a new RRCP accordingly. Optionally, the recipient may automatically check existing regular resources and apply this newly created RRCP to matching regular resources (e.g., use the common attributes as contained in RRCP to update regular resources, associate matching regular resources with the RRCP). If referenceResourceID is contained in Step 1, the attributes used for creating the RRCP may be the combination of attributes from referenceResourceID as indicated by attributeList and other attributes included in Step 1. At 3, the recipient sends a response to the originator with the identifier of the created RRCP included therein (e.g., rrcpID).

Figure 12:
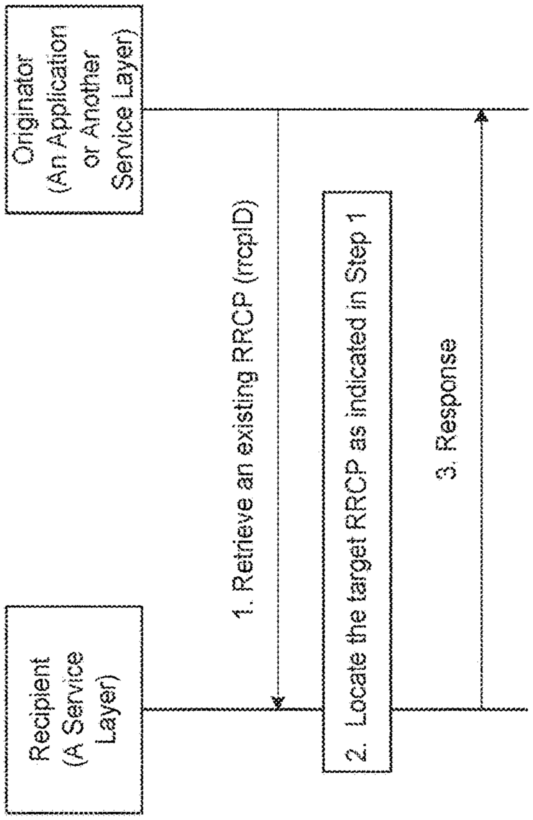
FIG. 12 is a call flow for retrieving a RRCP, in accordance with an example embodiment.

Referring now to FIG. 12, an example procedure for retrieving an existing RRCP is shown. At 1, an originator sends a request to a recipient, which contains the identifier or address of the RRCP (e.g., rrcpID) to be retrieved. At 2, the recipient locates the target RRCP and generates a response message to contain the content of the target RRCP. At 3, the recipient sends the response message to the originator.

Figure 13:
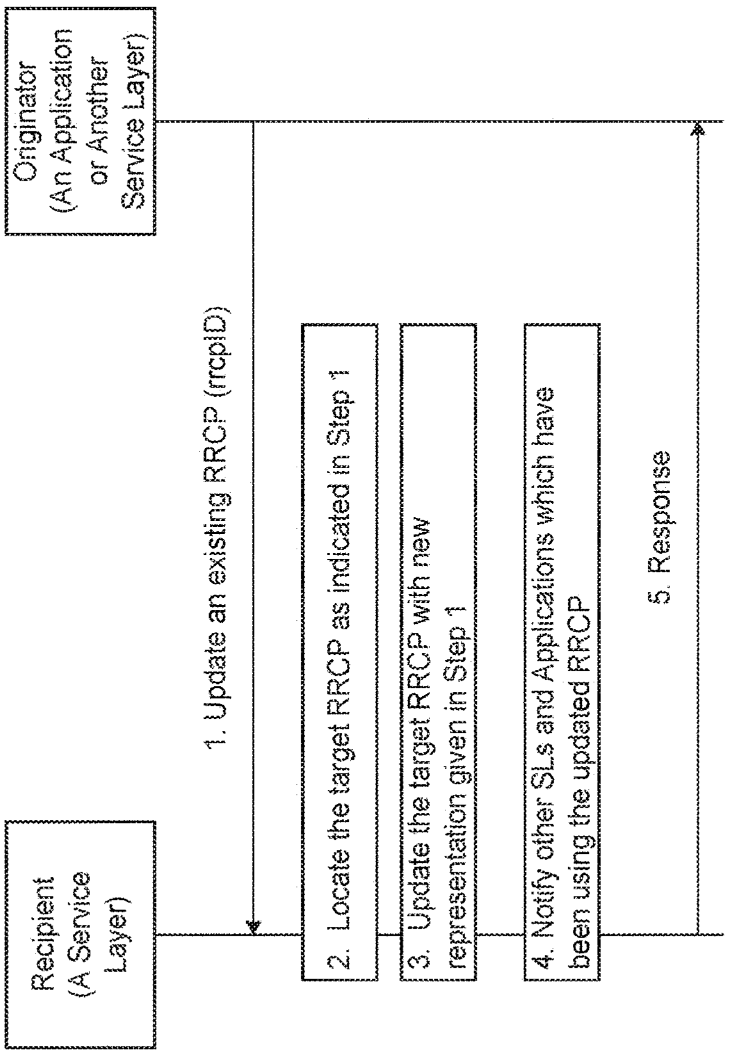
FIG. 13 is a call flow for updating a RRCP, in accordance with an example embodiment.
Figure 30:
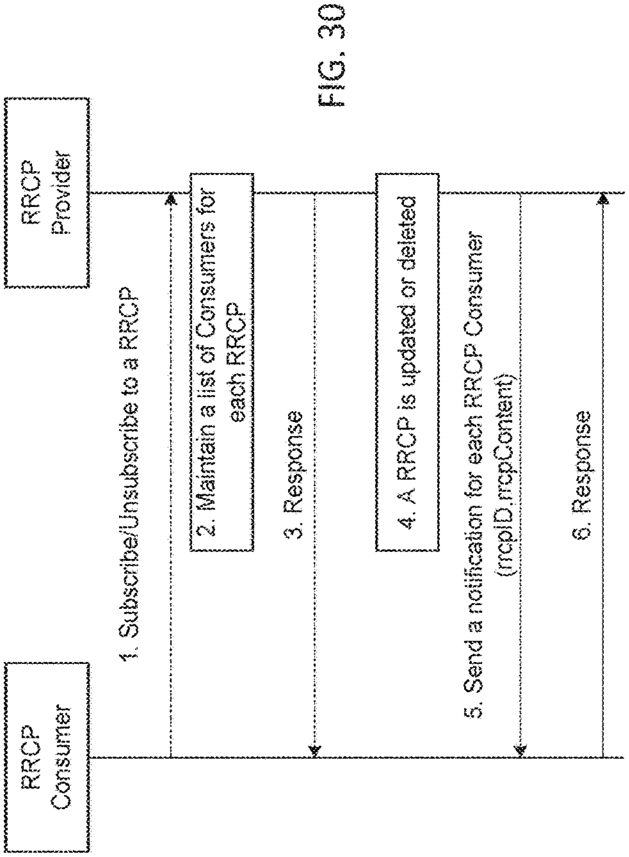
FIG. 30 is a call flow for call flow for synchronization caused by an updated or deleted RRCP, in accordance with an example embodiment.

Referring now to FIG. 13, an example procedure for updating an existing RRCP is shown. At 1, an originator sends a request to a recipient, which contains the content and identifier of the RRCP (i.e. rrcpID) to be updated. At 2, the recipient locates the target RRCP to be updated. At 3, the recipient updates the target RRCP using its new content as contained in Step 1. At 4, if the updated RRCP has been used by and/or has a persistent relationship with other regular resources, the recipient sends a notification to other SLs and applications where those regular resources reside so that those associated regular resources can be updated based on the updated RRCP content. In some cases, step 4 is optional if the updated attributes of RRCP are not related to, or will not impact, any regular resource. FIG. 30 illustrates example details on how to send such notifications. At 5, the recipient sends a response to the originator.

Figure 14:
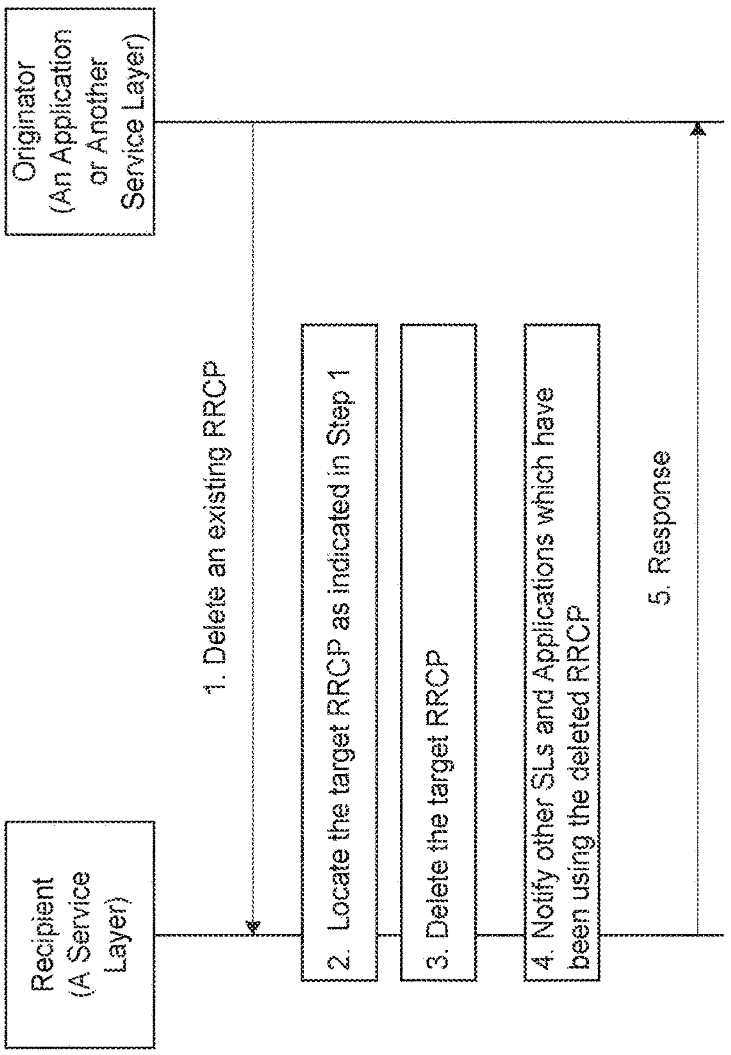
FIG. 14 is a call flow for deleting a RRCP, in accordance with an example embodiment.

Referring now to FIG. 14, an example procedure for deleting a RRCP is shown. At 1, in accordance with the illustrated example, an originator sends a request to a recipient, which contains the address or identifier of the RRCP (i.e., rrcpID) to be deleted. At 2, the recipient locates the target RRCP. At 3, the recipient deletes the target RRCP. At 4, if the deleted RRCP has been used by and/or has a persistent relationship with other regular resources, the recipient sends a notification to other SLs and applications where those regular resources reside, so that those associated regular resources can be deleted or recovered accordingly. FIG. 30 illustrates example details on how to send such notifications. At 5, the recipient sends a response to the originator.

Figure 15:
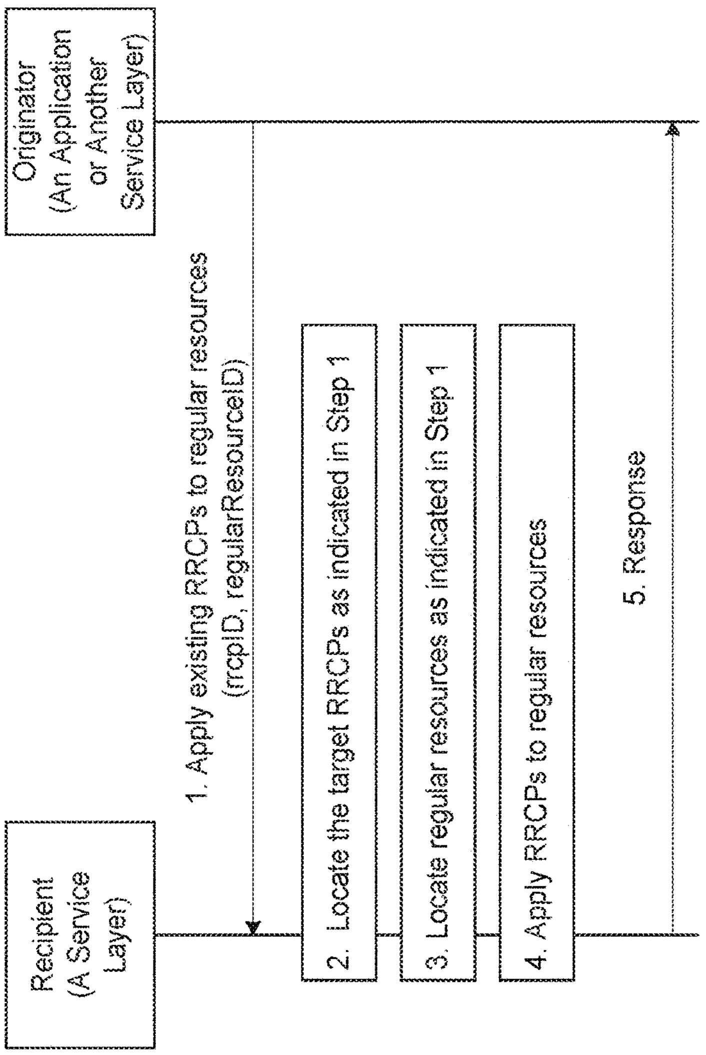
FIG. 15 is a call flow for applying resource representation common parts (RRCPs) to regular resources, in accordance with an example embodiment.
Figure 16:
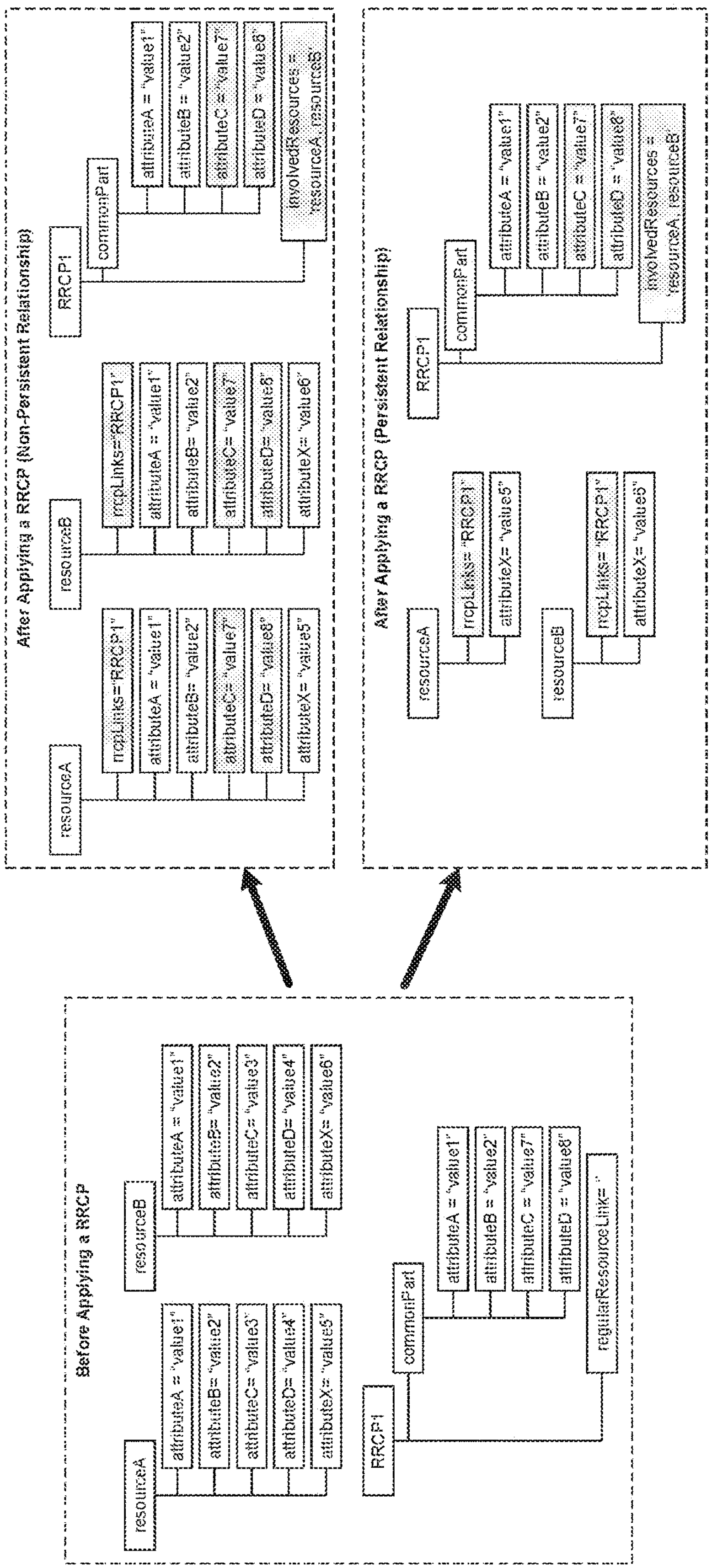
FIG. 16 depicts example structures for applying a RRCP to regular resources, in accordance with various example embodiments.

Referring to FIG. 15, an example procedure for applying an existing RRCP to some regular resources is shown. In doing so, the total size of those regular resources can be reduced, and, they can be operated more efficiently once they are associated with one or more RRCPs. At 1, in accordance with the illustrated example, an originator sends a request to a recipient, which contains identifiers of one or more RRCPs (e.g., rrcpID) and a list of regular resources (e.g., regularResourceID). Applying a RRCP to a regular resource may include: 1) updating the regular resource using common attributes as contained in the RRCP; 2) associating the regular resource and the RRCP together as a persistent or non-persistent relationship by either adding a rccpLinks to the regular resource and/or adding the regular resource identifier to the RRCP's regularResourceTarget attribute; 3) if the associated relationship is persistent, removing those common attributes contained in the RRCP from the regular resource. FIG. 16 depicts an example for a non-persistent relationship and another example for a persistent relationship. At 2, the recipient locates RRCPs as contained in Step 1. At 3, the recipient locates regular resources as contained in Step 1. At 4, the recipient checks if each regular resource does have those common attributes as contained in the RRCPs. Then, it applies each RRCP to each regular resource (e.g., use those common attributes as contained in each RRCP to update each regular resource, associate each regular resource with each applied RRCP, and optionally remove those common attributes from regular resources). Two examples are shown in FIG. 16. At 5, the recipient sends a response to the originator. The response message may indicate the results of applying RRCPs in Step 4 (e.g., which RRCP were not successfully applied to which regular resource).

Turning now to improved resource creating based on RRCP, when creating a regular resource, existing approaches usually need the full resource representation of the regular resource to be transmitted from the originator to the recipient. Given the fact that the full resource representation may have a large size and potentially exceed the maximum message size of an underlying network (e.g., LPWAN networks) among the originator and the recipient, it is recognized herein that the existing approaches may cause unaffordable overhead or barely work at all. Using RRCP, in some cases, there is no need to transmit the full resource representation of the regular resource from the originator to the recipient. Instead, the identifiers of related RRCPs may be stored at the recipient with other attributes that have new values and are not covered by the RRCPs.

Figure 17:
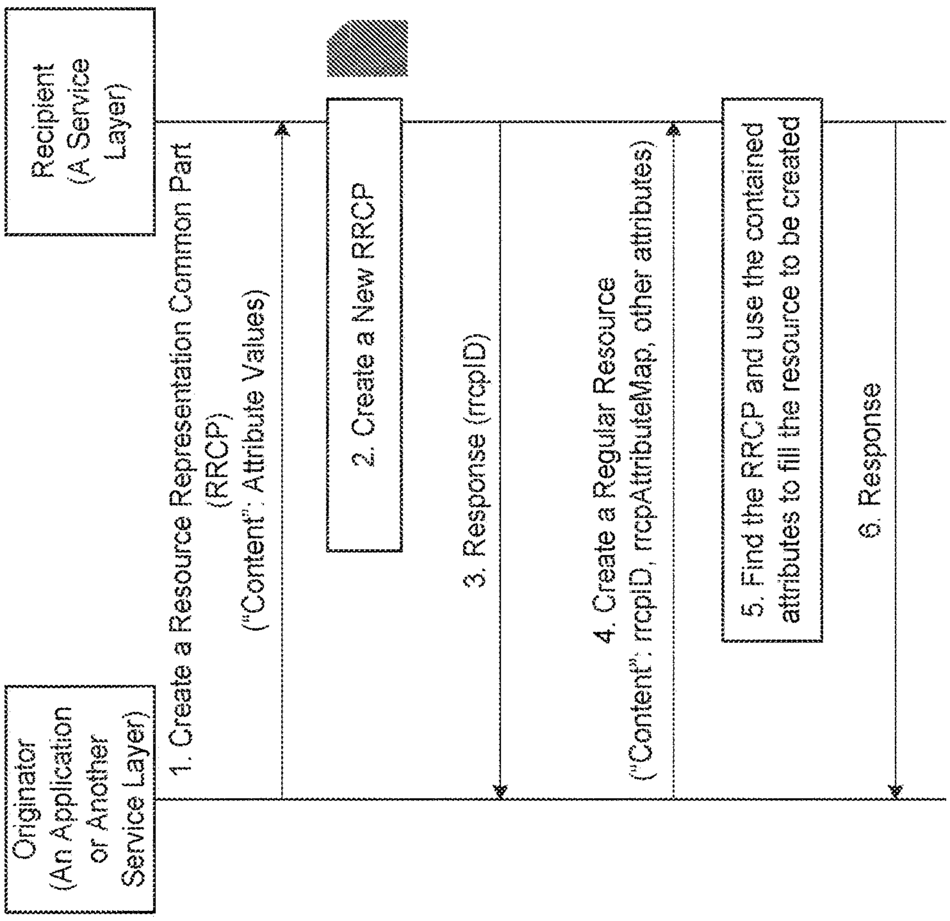
FIG. 17 is a call flow for improved resource creation based on the RRCP, in accordance with an example embodiment.

Referring to FIG. 17, an example for improving resource creation using RRCP is shown, where the originator first creates a RRCP at a recipient and then uses the RRCP for efficiently creating other regular resources at the recipient. In accordance with the illustrated example, steps 1-3 may be performed as described with reference to FIG. 11, where an originator first creates a RRCP at a recipient. At 4, the originator sends an optimized request to the recipient to create a regular resource. This message may contain the identifier of RRCP (e.g., rrcpID) being created via Steps 1-3 (and/or other RRCPs that the originator knows), rrcpAttributeMap, and other attributes that are not included in any RRCP and have to be included in this request message. The rrcpID may contain multiple RRCP identifiers. The rrcpAttributeMap may be used to indicate which attributes as included in a RRCP should be applied or not when creating the new regular resource. If the rrcpAttributeMap does not appear in the request message, common attributes in each RRCP may be applied. One implementation option for rrcpAttributeMap is to implement it as a bitmap. By way of example, assume the total number of attributes in a RRCP is less than 16, a 2-byte bitmap can be used for rrcpAttributeMap, where each bit stands for an attribute. For example, the value −1" of a bit may mean that the corresponding attribute should be applied and the value "0" may indicate that the attribute should not be applied. In some cases, the rrcpAttributeMap offers more flexibility for using RRCPs, and it may be optional parameter since it may add overhead to the optimized request message.

Still referring to FIG. 17, in accordance with the illustrated example, the recipient receives the request message from 4. The recipient may find the corresponding RRCPs as indicated by the rrcpID. In an example (Option 1), the recipient creates the regular resource using attributes contained in Step 4, and other common attributes contained in corresponding RRCPs and specified by rccpAttributeMap. In this example, in some cases, the recipient does not establish any relationship (or just a non-persistent relationship) between the created regular resource and the used RRCPs. In another example (Option 2), the recipient still creates the regular resource, but only assigns the regular resource with attributes contained in Step 4 (not common attributes contained in RRCPs), and then associates the regular resource to the used RRCPs (e.g., persistent relationship with RRCPs). In this example, the total size of the created regular resource may be smaller than in the preceding example. The recipient itself may decide to use option 1 or option 2. Alternatively, the originator can indicate a preferred option in Step 4 (e.g., to indicate if a persistent or non-persistent relationship between RRCPs and created regular resource should be maintained by the recipient). In some examples, if a RRCP is partially used as indicated by rrcpAttributeMap, the recipient does not establish a persistent relationship between it and the created regular resource, for the purpose of simplicity. At 6, the recipient sends a response to the originator.

Figure 18:
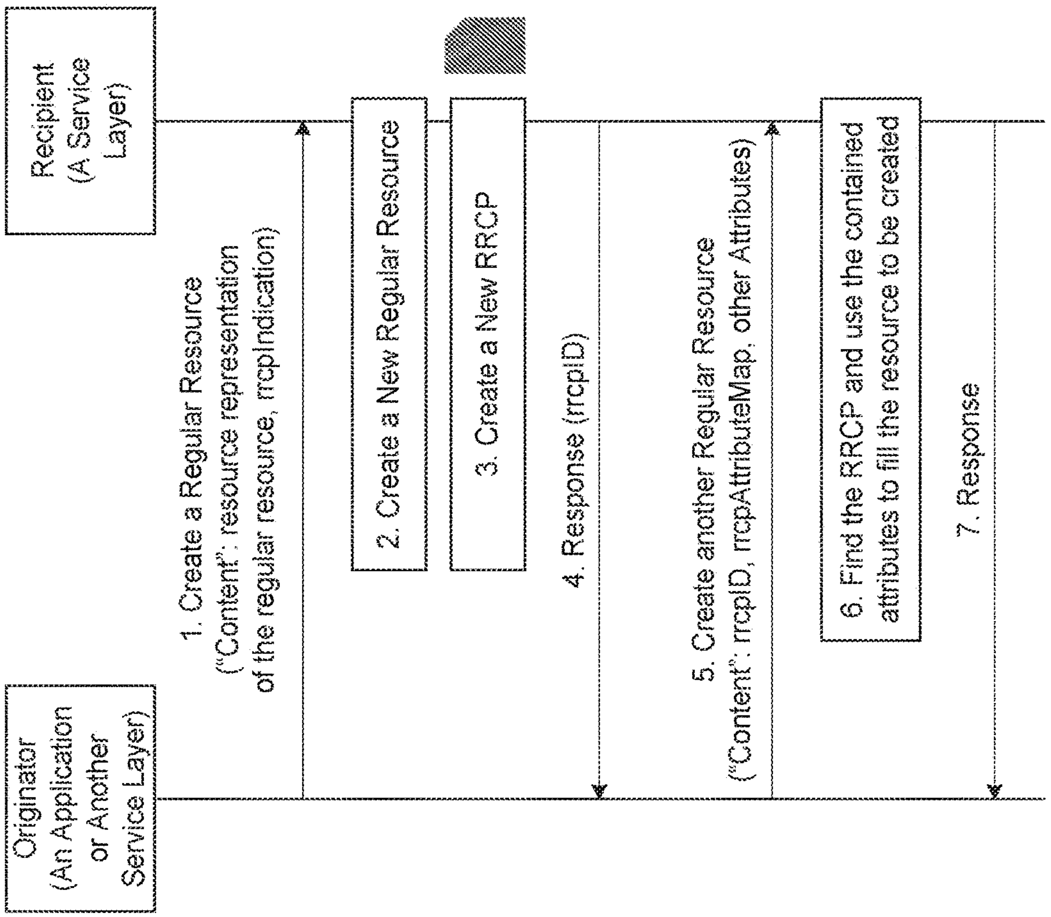
FIG. 18 is another call flow for improved resource creation based on the RRCP, in accordance with another example embodiment.

Referring to FIG. 18, an example method for improving resource creation using RRCP is shown, where an originator first jointly creates a regular resource and a RRCP at a recipient. Then, it uses the created RRCP to optimize the creation of more regular resources in the future. At 1, in accordance with the illustrated example, the originator sends a request to the recipient to create a new regular resource. This message may contain the full resource representation of the regular resource to be created. In addition, a new parameter rrcpIndication is contained in this step to indicate to the recipient: 1) one or more RRCPs need to be created; 2) the list of attributes of the regular resource to be contained in each created RRCP. At 2, the recipient creates the new regular resource according to the full resource representation as contained in Step 1. At 3, the recipient creates one or more RRCPs as indicated by rrcpIndication. In some cases, if Step 2 fails, the recipient might not create a RRCP at all. Alternatively, for example, the recipient may create the RRCP first and then create the regular resource. In addition, even if rrcpIndication is not contained in Step 1, the recipient may automatically create a RRCP based on its own intelligence and observation of present and previous request messages from the originator and other requestors, which can also be specified in, and autonomously triggered by, some rules or policies. At 4, the recipient may send a response to the originator. The response message may contain the rrcpID to indicate the identifier or address of created RRCPs in Step 3. In some examples, even if none of the RRCPs are created at 3, the recipient may contain an existing RRCP, including its identifier and content in this response message, to proactively inform the originator of available RRCPs. At 5, the originator requests to create another regular resource, which can use the RRCP created in Step 3. This step may be the same as Step 4 in FIG. 17. Similarly, steps 6 and 7 may be performed as described with reference to steps 5 and 6, respectively, in FIG. 17.

Figure 19:
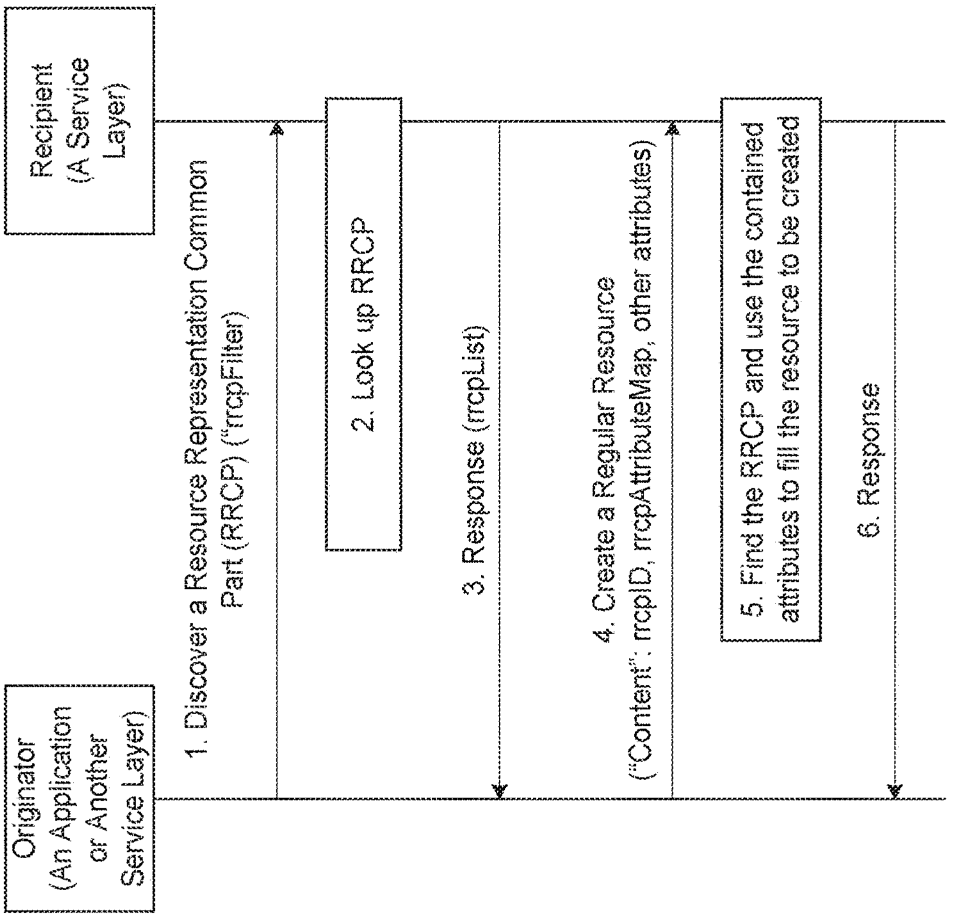
FIG. 19 is yet another call flow for improved resource creation based on the RRCP, in accordance with yet another example embodiment.

Referring to FIG. 19, an example method for improving resource creation using RRCP is shown, where an originator first discovers a RRCP from a recipient. Then, the originator uses the discovered RRCP to optimize the creation of regular resources. At 1, in accordance with the illustrated example, the originator first sends a discovery request to the recipient to discover appropriate RRCP to be used in Step 4. This message may contain a new parameter rrcpFilter to describe the properties or conditions of desired RRCPs. For example, if the content of rrcpFilter is: targetResourceTypes="oneM2M-contentInstance", then RRCPs that can be applied to oneM2M <contentInstance> resources are discovered. At 2, the recipient searches locally maintained RRCPs to find those that match rrcpFilter. At 3, the recipient sends the discovered RRCPs in rrcpList to the originator. The rrcpList may include the identifiers and/or the content of the discovered RRCPs. At 4, the originator uses discovered RRCPs to create a regular resource. This step may be the same as Step 4 in FIG. 17. Similarly, steps 6 and 7 may be performed as described with reference to steps 5 and 6, respectively, in FIG. 17.

Figure 20:
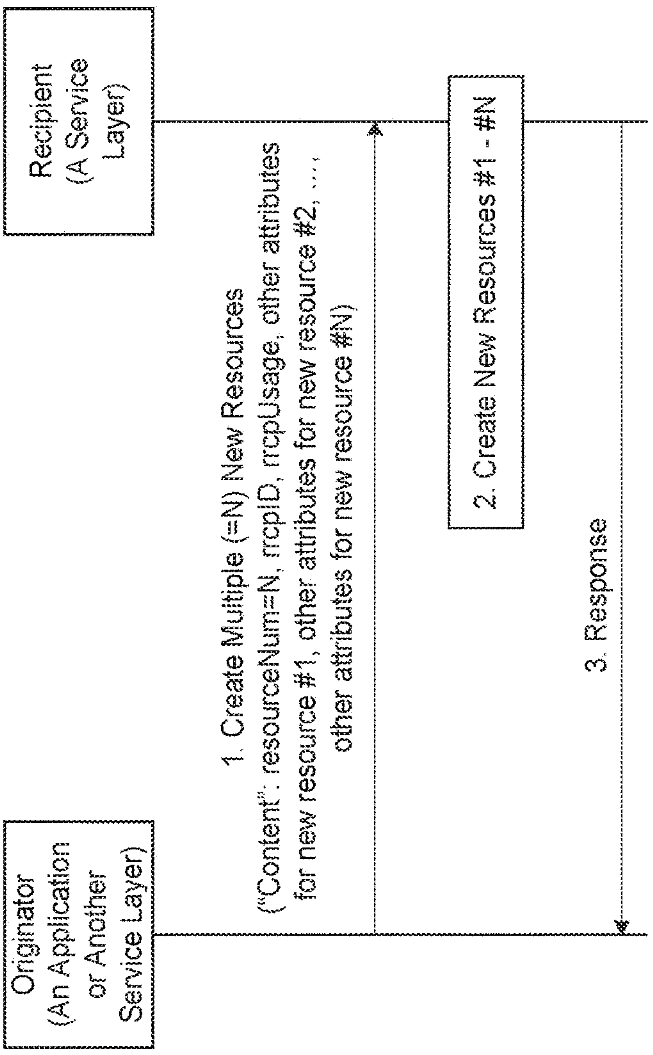
FIG. 20 is yet another call flow for improved resource creation based on the RRCP, in accordance with yet another example embodiment.

Referring now to FIG. 20, an example method for improving resource creation using RRCP is shown, where an originator uses RRCPs to create multiple regular resources simultaneously at a recipient. For example, the originator may have accumulated or buffered multiple data items, and it may need to store those data items at the recipient by creating a different resource for each data item. In some cases, those data items may be stored under the same parent resource. Instead of creating a resource for each item using separate requests, the originator can leverage the ideas depicted in FIG. 20 to more efficiently accomplish this task.

At 1, in accordance with the illustrated example, the originator uses one request to create multiple regular resources, which will be based on the same or different RRCPs. First, this request contains some attributes for each new resource, which are not included in any RRCP. Second, this request contains a list of RRCPs in rrcpID parameter. There are several example options (specified by another new parameter rrcpUsage) to use RRCPs indicated by rrcpID:

Example Option 1: All RRCPs are used together to create each new resource (e.g., rrcpUasage="A114A11–).

Example Option 2: Each RRCP is used to create a different new resource (e.g., rrcpUsage="One4Each").

Example Option 3: This is a hybrid case of example option 1 and example option 2. Some RRCPs may be used together to create one or multiple new resources as in example option 1. Other RRCPs may be used the same as example option 2 (e.g., rrcpUsage="Hybrid").

Continuing with reference to FIG. 20, at 2, the recipient creates the requested number of resources according to parameters resourceNum, rrcpID, rrcpUsage, and other attributes as contained in Step 1. At 3, the recipient sends a response to the originator. The recipient may contain the identifiers of successfully created resources in this response message.

Figure 21:
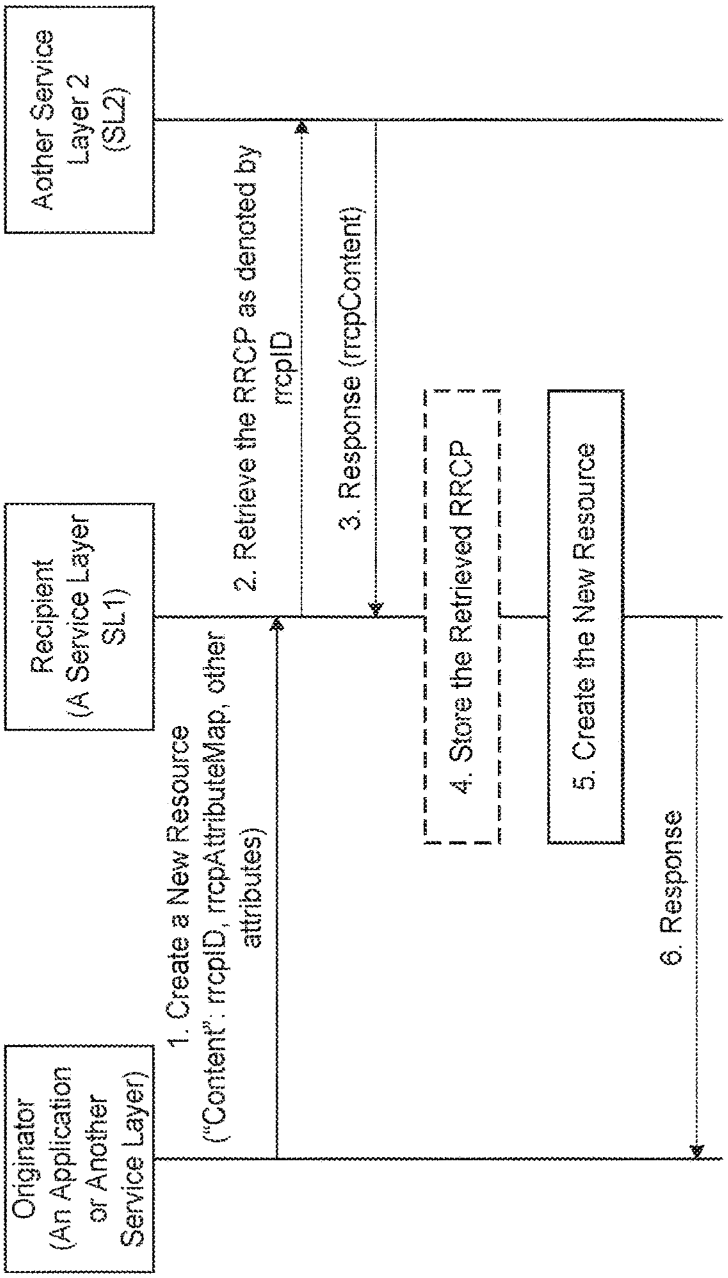
FIG. 21 is yet another call flow for improved resource creation based on the RRCP, in accordance with yet another example embodiment.

Referring to FIG. 21, an example method for improving resource creation using RRCPs is shown, where the related RRCPs are not stored at the recipient but at another service layer SL2. At 1, the originator sends a request to the recipient to create a new regular resource. The request message contains a list of RRCPs (i.e., rrcpID), as described with reference to step 4 in FIG. 17. At 2, the recipient finds out that the indicated RRCPs are stored in another SL2. Accordingly, it may first send a request to SL2 to retrieve the content of each RRCP. At 3, SL2 sends RRCP content to the recipient (i.e., rrcpContent). In some cases, the recipient may repeat Step 2 and Step 3 multiple times to retrieve each RRCP as indicated in Step 1. At 4, optionally, the recipient may store the retrieved RRCP content locally for future use. Steps 5 and 6 may be performed as described with reference to steps 5 and 6, respectively, in FIG. 17.

Figure 22:
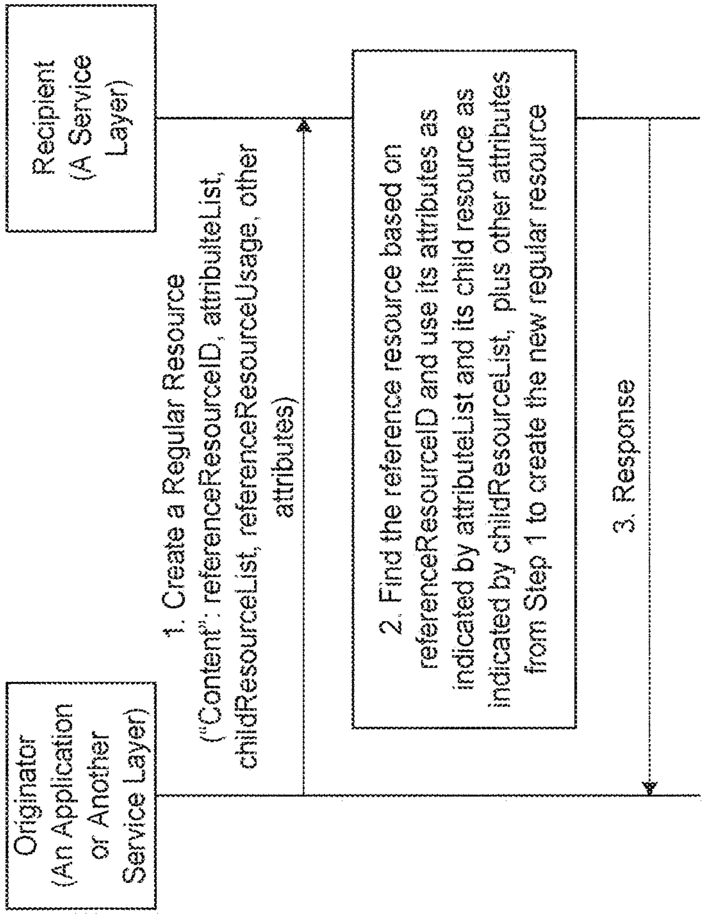
FIG. 22 is a call flow for improved resource creation without using the RRCP, in accordance with an example embodiment.

Referring to FIG. 22, an example method is depicted in which an existing regular resource can be leveraged as a reference resource to create another regular resource in a more efficient way (i.e., to enable a much shorter request message) without using any RRCP. In some cases, this example may be similar to the example depicted in FIG. 11, for instance when parameters referenceResourceID and attributeList are used. At 1, in accordance with the illustrated example, an originator sends a request to a recipient, which contains, for example, referenceResourceID, attributeList, referenceResourceUsage, and other attributes of the resource to be created. The referenceResourceID may indicate an existing regular resource, which the recipient may use as a reference resource to create the new regular resource. The attributeList may indicate the list of attributes from the reference resource, which may be used to create the new regular resource. The childResourceList may indicate the list of child resources from the reference resource, which may be used to create the new regular resource. The referenceResourceUsage may indicate how the reference resource will be leveraged by the recipient to create a new regular resource. For example:

If referenceResourceUsage="AttributeOnly", in some cases, the recipient will only use attributes (not the child resource) as indicated in attributeList (or all attributes if attributeList does not appear) and other attributes contained in Step 1 to create the new regular resource.

If referenceResourceUsage="ChildResourceOnly", in some cases, the recipient will only use child resources (not the attribute) as indicated in childResourceList (or all child resources if childResourceList does not appear) and other attributes contained in Step 1 to create the new regular resource.

If referenceResourceUsage="AttributeAndChildResource", in some cases, the recipient will use attributes as indicated in attributeList, child resources as indicated in childResourceList, and other attributes contained in Step 1 to create the new regular resource Still referring to FIG. 22, at 2, in accordance with the illustrated example, the recipient receives the request and creates a new regular resource accordingly. The attributes used for creating the new resource may be the combination of attributes from referenceResourceTD as indicated by attributeList and other attributes contained in Step 1. If childResourceList is contained in Step 1, corresponding child resources of the reference resource may be used to create child resources for the new regular resource, as specified by referenceResourceUsage. At 3, the recipient sends a response to the originator with the identifier of created resource. The approach exemplified in FIG. 22 can also be used to create multiple new regular resources, for example, to include a resourceNum parameter in Step 1 of FIG. 22, similar to FIG. 20.

When updating a regular resource, it is recognized herein that existing approaches often need the new and likely partial resource representation of the regular resource to be transmitted from the originator to the recipient. Given that the new resource representation may have a large size and potentially exceed the maximum message size of an underlying network (e.g., LPWAN networks) among the originator and the recipient, the existing approaches may cause unaffordable overhead. Using RRCP, in accordance with various embodiments, there may be no need to transmit the new resource representation of the regular resource from the originator to the recipient.

Figure 23:
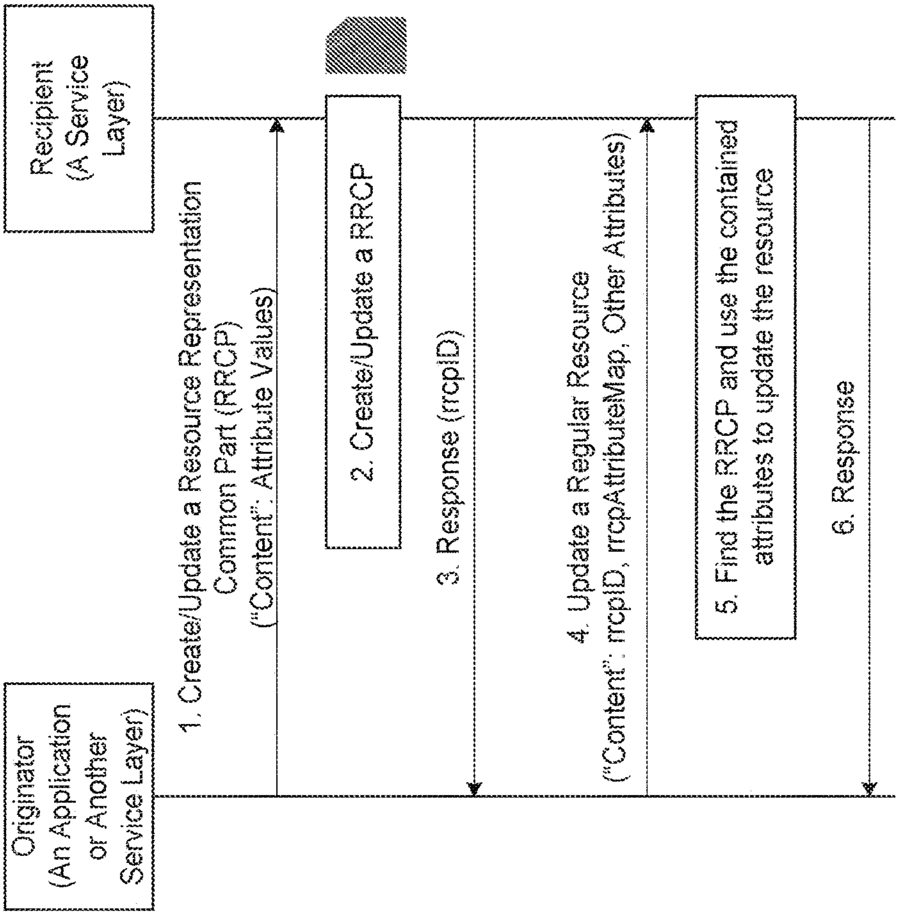
FIG. 23 is a call flow for an improved resource update based on the RRCP, in accordance with an example embodiment.

Referring to FIG. 23, an example method for improving resource update using RRCP is shown, where the originator first creates a RRCP at a recipient and then uses the RRCP for efficiently updating other regular resources at the recipient. At 1 to 3, an originator first creates or updates a RRCP at a recipient. At 4, in accordance with the illustrated example, the originator sends a request to the recipient to update a regular resource. This message may contain, for example and without limitation, the identifier of the RRCP (i.e., rrcpID) being created via Steps 1-3 (and/or other RRCPs that the originator knows), rrcpAttributeMap, other attributes that are not included in any RRCP and have to be included in this step, and the identifier of the regular resource to be updated. The rrcpID may contain multiple RRCP identifiers. In some examples, the rrcpAttributeMap is used to indicate which attributes contained in RRCPs should be applied or not when updating the target resource. In an example, if the rrcpAttributeMap does not appear in the request message, the common attributes in each RRCP should be applied. In some cases, the rrcpAttributeMap offers more flexibility to use the RRCP.

Still referring to FIG. 23, at 5, in accordance with the illustrated example, the recipient receives the request message from 4. It finds the corresponding RRCPs as indicated by the rrcpID. In the example option 1, the recipient updates the regular resource using attributes contained at 4, and other common attributes contained in corresponding RRCPs and specified by the rrcpAttributeMap. In this example option, the recipient does not establish or change any relationship (or just a non-persistent relationship) between the updated regular resource and the used RRCPs. In another example (example option 2), the recipient may update the regular resource, but might only assign the regular resource with attributes contained in Step 4 (not common attributes contained in RRCPs), and then associate the regular resource to the used RRCPs (i.e., persistent relationship with RRCPs). In this example (example option 2), the total size of the updated regular resource may be smaller than in the example option 1. The recipient itself may decide to use the example option 1 or the example option 2. Alternatively, the originator can indicate a preferred option in Step 4 (i.e., to indicate if a persistent or non-persistent relationship between RRCPs and update regular resource should be maintained by the recipient). In some cases, if a RRCP is partially used as indicated by rrcpAttributeMap, the recipient will not establish a persistent relationship between it and the updated regular resource. At 6, the recipient sends a response to the originator.

Figure 24:
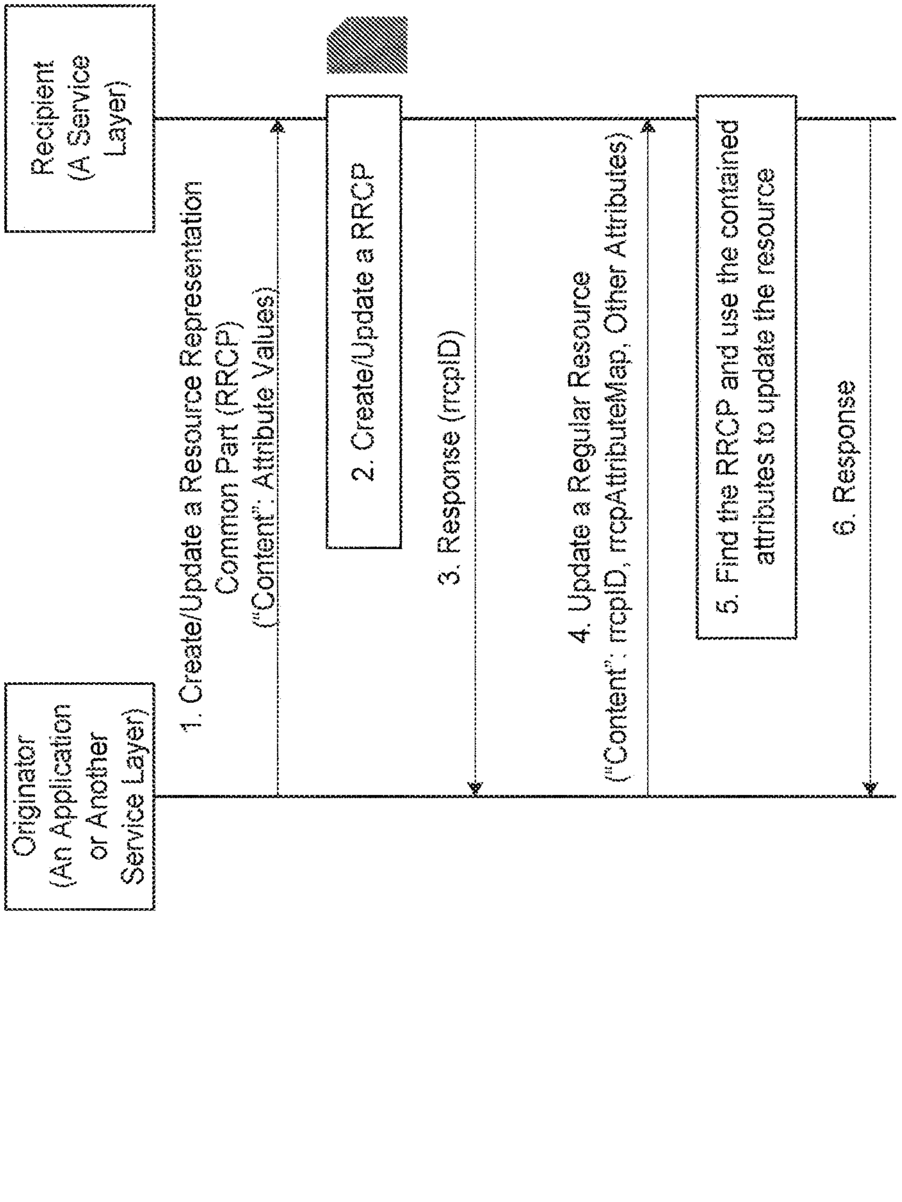
FIG. 24 is another call flow for an improved resource update based on the RRCP, in accordance with another example embodiment.

Referring now to FIG. 24, an example method for improving resource updates using a RRCP is shown, where an originator first creates a RRCP at a recipient jointly when updating a regular resource. Then, it uses the created RRCP to optimize the update of more regular resources in the future. At 1, in accordance with the illustrated example, the originator sends a request to the recipient to update a new regular resource. This message may contain the new resource representation of the target resource to be updated. In addition, a new parameter rrcpIndication may be contained in this step to indicate to the recipient, for example and without limitation: 1) one or more RRCPs that need to be created; and 2) the list of attributes of the regular resource that should be included in each RRCP to be created. At 2, the recipient updates the target regular resource according to the resource representation as contained in Step 1. In some cases, if Step 2 is fails, the recipient might not create a RRCP. Alternatively, the recipient may create the RRCP first and then update the regular resource. In addition, in some examples, even if rrcpIndication is not contained in Step 1, the recipient may automatically create a RRCP based on its own intelligence and observations of present and previous request messages from the originator and other requestors, which can also be specified in, and autonomously triggered by, one or more rules or policies. At 3, the recipient creates one or more RRCPs as indicated by the rrcpIndication. At 4, the recipient sends a response to the originator. The response message may contain the rrcpID to indicate the identifiers of created the RRCPs at 3. In some cases, even if none of RRCPs is created in Step 3, the recipient may contain an existing RRCP, including its identifier and content, in this response message to proactively inform the originator of available RRCPs. At 5, the originator requests to update another regular resource, which can use the RRCP being created in at 3. Steps 4, 5, and 6 may proceed as described with reference to steps 4, 5, and 6, respectively, in FIG. 23.

Figure 25:
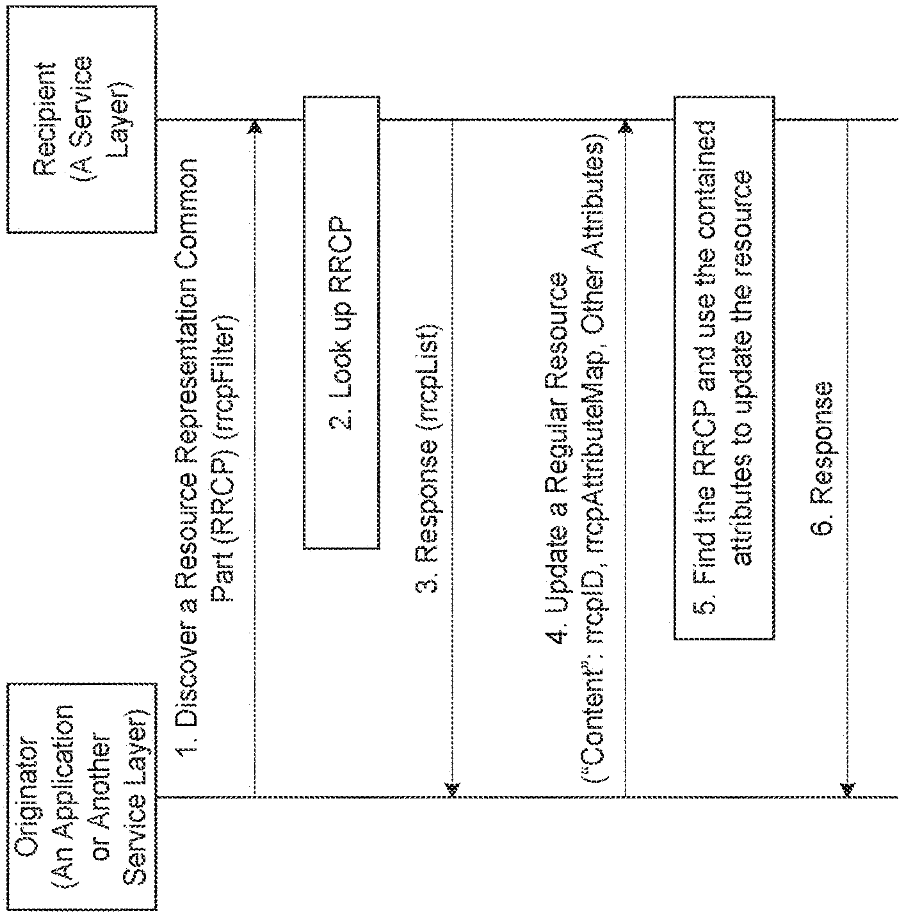
FIG. 25 is yet another call flow for an improved resource update based on the RRCP, in accordance with yet another example embodiment.

Referring to FIG. 25, an example method for improving resource update using RRCP is shown, where an originator first discovers a RRCP from a recipient. Then, the originator uses the discovered RRCP to optimize the update of regular resources. At 1, in accordance with the illustrated example, the originator first sends a discovery request to the recipient to discover appropriate RRCPs to be used in Step 4. This message may contain a new parameter rrcpFilter to describe the properties or conditions of desired RRCPs. At 2, the recipient searches locally maintained RRCPs to find those that match the rrcpFilter. At 3, the recipient sends the discovered RRCPs to the originator (i.e., rrcpList). The rrcpList may include the identifiers and/or content of the discovered RRCPs. At 4, the originator uses discovered RRCPs to update a regular resource. Steps 4, 5, and 6 may proceed as described with reference to steps 4, 5, and 6, respectively, in FIG. 23.

Figure 26:
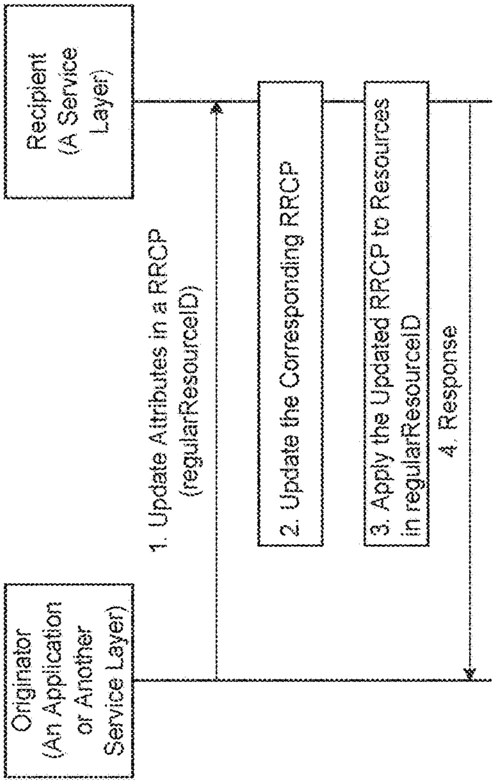
FIG. 26 is yet another call flow for an improved resource update based on the RRCP, in accordance with yet another example embodiment.

Referring to FIG. 26, an example method for improving resource updates using RRCPs is shown, where the originator requests that the recipient: 1) updates a RRCP and 2) uses the updated RRCP for some existing regular resources. At 1, in accordance with the illustrated example, the originator sends a request to the recipient to update one or more RRCPs and in the meantime, indicates that the updated RRCP may be applied to a list of regular resources (i.e. regularResourceID). At 2, the recipient first updates the corresponding RRCP. At 3, the recipient applies the updated RRCP to a list of regular resources as included in the regularResourceID. At 4, the recipient sends a response to the originator.

Figure 27:
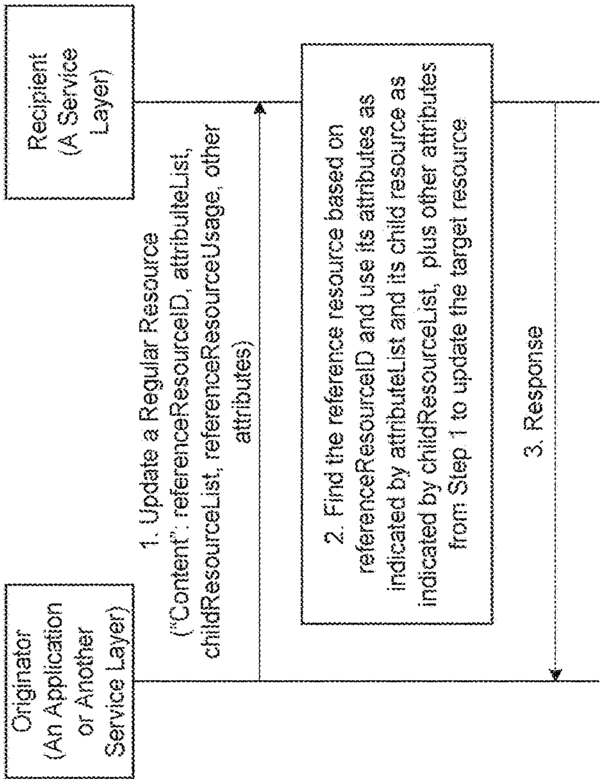
FIG. 27*a* call flow for an improved resource update without using the RRCP, in accordance with yet another example embodiment.

In another example method as illustrated in FIG. 27, an existing regular resource can be leveraged as a reference resource to update another regular resource in a more efficient way (i.e., to enable a much shorter request message) without using any RRCP. This example method is like the procedure illustrated in FIG. 11, when parameters referenceResourceID and attributeList are used. Referring to FIG. 27, at 1, in accordance with the illustrated example, an originator sends a request to a recipient, which may contain the referenceResourceID, attributeList, and other attributes of the resource to be updated. The referenceResourceID may indicate an existing regular resource, which the recipient may use as a reference resource to update the target resource. The attributeList may indicate the list of attributes from the reference resource, which may be used to update the target resource. The childResourceList may indicate the list of child resources from the reference resource, which may be used to update the target resource. The referenceResourceUsage may indicate how the reference resource may be leveraged by the recipient to update the target resource. For example:

- If referenceResourceUsage="AttributeOnly", then the recipient may use attributes (not the child resource) as indicated in attributeList (or all attributes if attributeList does not appear) and other attributes contained in Step 1 to update the target resource.
- If referenceResourceUsage="ChildResourceOnly", then the recipient may use child resources (not the attribute) as indicated in childResourceList (or all child resources if childResourceList does not appear) and other attributes contained in Step 1 to update the target resource.

If referenceResourceUsage="AttributeAndChild Resource"—The recipient will use attributes as indicated in attributeList, child resources as indicated in childResourceList, and other attributes contained in Step 1 to update the target resource.

At 2, in accordance with the illustrated example, the recipient receives the request and updates the target resource accordingly. The attributes used for updating the target resource may include the combination of attributes from referenceResourceID as indicated by attributeList and other attributes contained in Step 1. If the childResourceList is contained in Step 1, corresponding child resources of the reference resource may also be used to update child resources for the target resource, as specified by referenceResourceUsage. At 3, the recipient sends a response to the originator.

Figure 28:
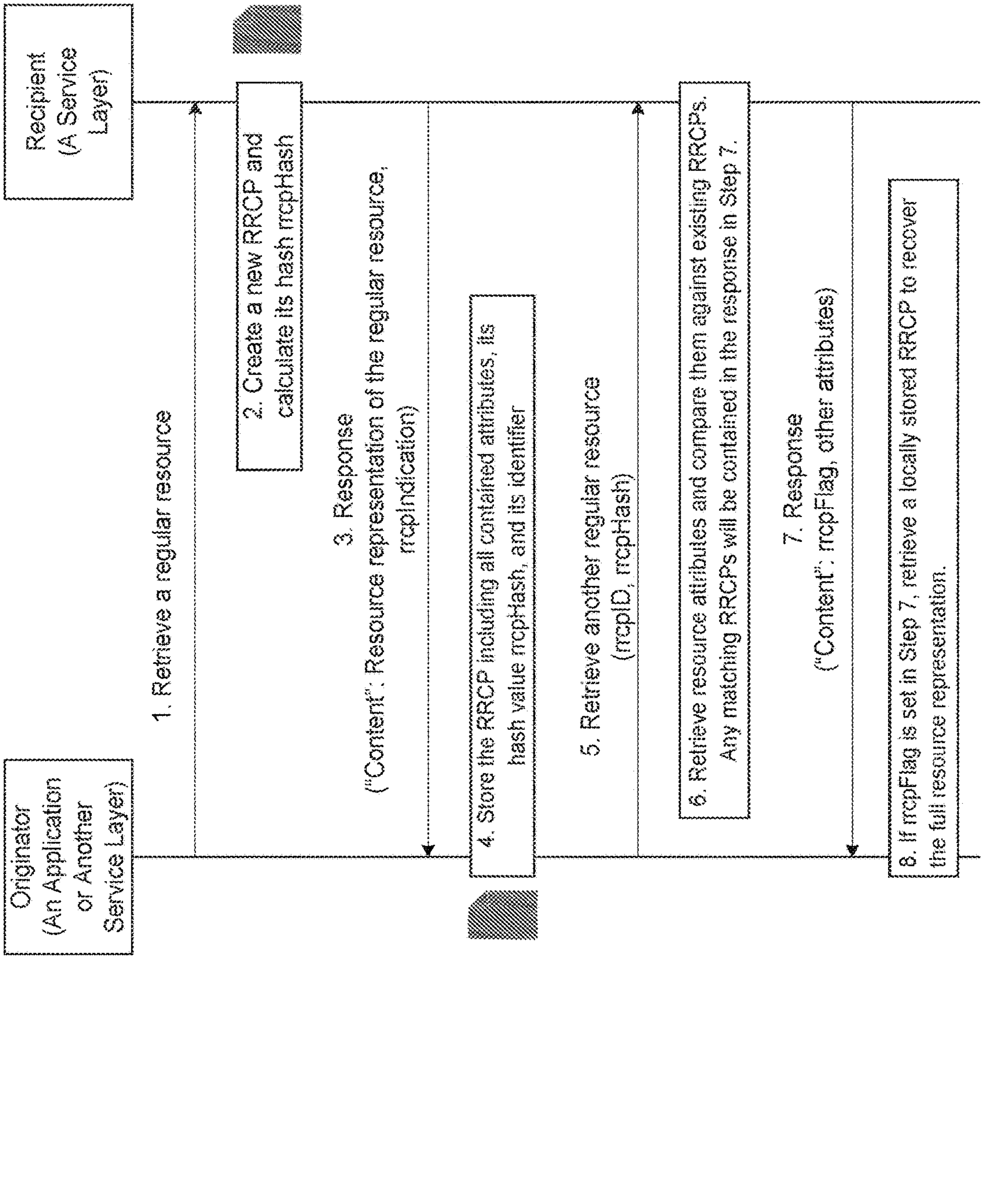
FIG. 28 is a call flow for an improved resource retrieval based on the RRCP, in accordance with an example embodiment.

FIG. 28 illustrates an example for improved resource retrieval using RRCPs, where a recipient first instructs an originator to store a RRCP locally, which is also stored at the recipient side. Next time, when the originator requests to retrieve a regular resource related to the locally stored RRCP, the recipient may leverage this RRCP to optimize the response message from the recipient to the originator by containing only the RRCP identifier and other attributes not included in the RRCP, instead of a full resource representation of the retrieved resource. Referring to FIG. 28, in accordance with the illustrated example, at 1, the originator sends a request to the recipient to retrieve a regular resource. The originator may use a parameter repeatFlag to indicate that it may repeatedly retrieve the same resource or the same type of other regular resources in the future if repeatFlag=TRUE, for instance. At 2, the recipient may locate the target resource to be retrieved. It may also determine that some attributes of the target resource likely will not change for a certain time duration. Then, it may create a new RRCP to contain those attributes, especially when the originator has indicated the interest in retrieving the same resource or the same type of resources later. At 3, the recipient generates and sends a response message to the originator. This response message may contain, for example and without limitation: 1) the full resource representation of the target resource; 2) and a new parameter rrcpIndication that may include the list of attributes being contained in the created RRCP, the identifier of the created RRCP (i.e., rrcpID), and the hash of the created RRCP representation (i.e., rrcpHash). The list of attributes in the created RRCP may be included in the full resource representation of the target resource so that the recipient can know their values from the full resource representation.

Continuing with the example, at 4, the originator receives the response message from Step 3. Then it may conduct the following actions, presented by way of example and without limitation: 1) store the full resource representation of the target resource; 2) duplicate and store a local RRCP according to rrcpIndication; and 3) store the hash of the RRCP as received in Step 3. In some cases, the originator does not need to recalculate the hash of the RRCP, which may be beneficial especially when the originator is a constrained device and has limited computational capability. At 5, the originator starts to retrieve another regular resource but with the same type of the regular resource as in Step 1. In some cases, the originator contains rrcpID and rrcpHash in this message with the hope that the RRCP created for the target resource in Step 2 & 4 can be reused for this new target resource. At 6, the recipient receives the request message from Step 5. It retrieves the attributes of the target resource. Then, it compares the RRCP as indicated by rrcpID with the attributes of the target resource. In some examples, if the target resource has the same attributes including their values as those common attributes contained in the RRCP, it means the RRCP can be reused and the recipient will furthermore compare the rrcpHash received from Step 4 with the hash of the local RRCP. If both hashes are equal, in some cases, it implies that the RRCP maintained at both the originator and the recipient are still the same. Until now, the recipient may determine that the RRCP can be used to reduce the size of response message in Step 7. At 7, the recipient generates and sends an optimized response message to the originator. If the recipient determines in Step 6 that the RRCP will be used to optimize the response message, the response message may contain rrcpFlag (to indicate that the RRCP as indicated in Step 5 has been used) and other attributes of the target resource that are not contained in the RRCP. Otherwise, the response message may need to contain the full resource representation of the target resource being retrieved. Alternatively, the recipient might not include rrcpFlag, but may include rrcpID in the response message. At 8, in accordance with the illustrated example, if the rrcpFlag is set in Step 7, the originator may retrieve the locally stored RRCP (i.e., the RRCP as indicated in Step 5) to recover or augment the full resource representation of the target resource. If rrcpFlag or rrcpID is not included in Step 7, the originator may process the message from Step 7 as a regular response.

Figure 29:
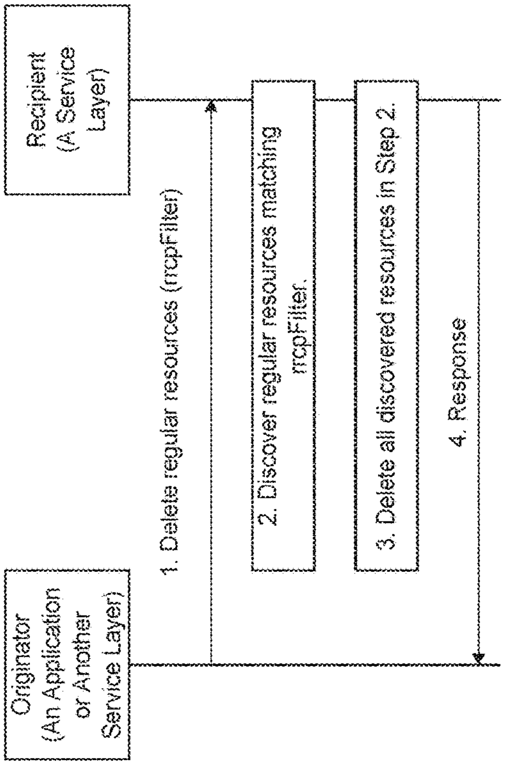
FIG. 29 is a call flow for an improved resource deletion based on the RRCP, in accordance with an example embodiment.

Referring now to FIG. 29, an example procedure improved resource deletion using RRCPs is shown, where the originator uses one request to delete one or more regular resources that match certain RRCP criteria. At 1, in accordance with the illustrated example, the originator sends a request to the recipient to delete multiple resources that use or have a persistent relationship with one or multiple RRCPs. For this purpose, rrcpFilter may be contained in this request. At 2, the recipient uses the rrcpFilter to discover regular resources, which use certain RRCPs that match the rrcpFilter. At 3, the recipient deletes discovered regular resources if permissioned to do so. For example, those multiple regular resources may be owned by the originator or the originator may have access to delete them. At 4, the recipient sends a response to the originator.

With respect to synchronization between an RRCP Provider and an RRCP Consumer, FIG. 30 illustrates an example procedure for notifying regular resources when an associated RRCP has been changed. Here, the RRCP consumer is defined as the service layer entity that host regular resources, which use some RRCPs. The RRCP provider is the service layer entity that hosts RRCPs. At 1, in accordance with the illustrated example, if the RRCP consumer has a regular resource based on a RRCP, the RRCP makes a subscription to the RRCP. At 2, the RRCP provider maintains a list of RRCP consumers for each RRCP. At 3, the RRCP provider sends a response message to the RRCP consumer indicating if the subscription in Step 1 is successful or not. At 4, in accordance with the illustrated example, the RRCP is updated or deleted. At 5, the RRCP provider sends a notification to the RRCP consumers, for instance all the RRCP consumers, using this RRCP. The notification message may contain the RRCP identifier (i.e., rrcpID) and the new content of RRCP (i.e., rrcpContent). At 6, if the RRCP is updated in Step 4, the RRCP consumer may use its new content to update the associated regular resources. Otherwise, if the RRCP is deleted in Step 4, the RRCP consumer may delete the associated regular resources or remove the RRCP link from them. Then, RRCP consumer may send a response to the RRCP provider. For example, if the relationship between a regular resource and the corresponding RRCPs is persistent, changes to RRCPs may be applied to the regular resource. Otherwise, in some cases, if the relationship is non-persistent, changes to RRCPs will not be applied to the regular resource. In addition, in some examples, if the RRCP consumer is not willing to adopt the new RRCP, the RRCP consumer may still keep the old representation of the regular resource, but remove the RRCP link from this regular resource.

Figure 31:
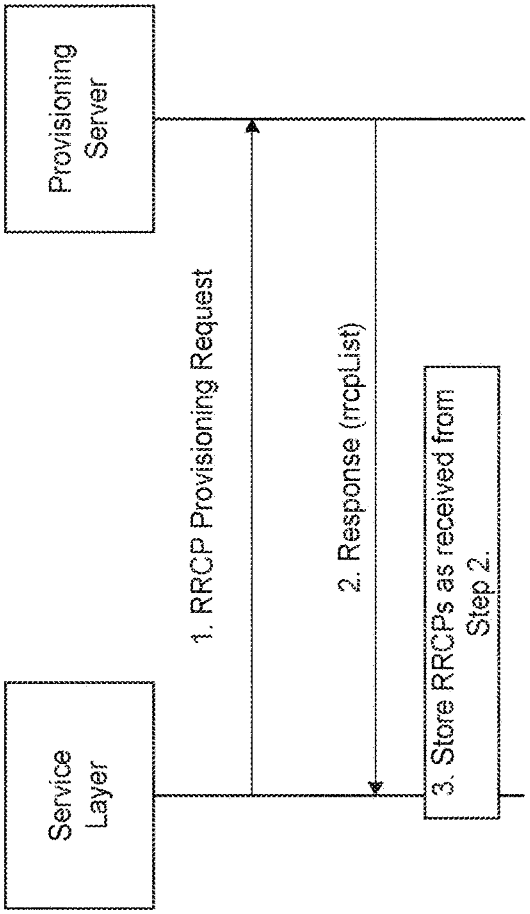
FIG. 31 is a call flow for pull-based RRCP provisioning, in accordance with an example embodiment.
Figure 32:
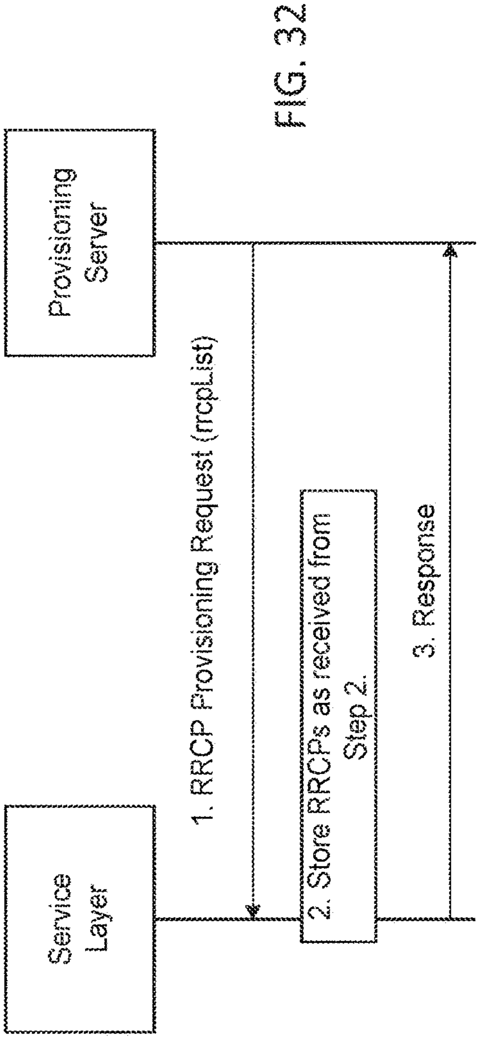
FIG. 32 is a call flow for push-based RRCP provisioning, in accordance with an example embodiment.

Turning now to RRCP provisioning and assignment, RRCPs at an SL can be provisioned by a provisioning server using a pull-based or push-based approach. FIG. 31 illustrates an example procedure for pull-based RRCP provisioning, where the SL actively retrieves RRCPs from the provisioning server, like the example procedure for retrieving a RRCP in FIG. 12. FIG. 32 shows an example procedure for push-based RRCP provisioning, where the provisioning server actively pushes RRCPs to the SL, like the example procedure for creating a RRCP in FIG. 11.

Figure 33:
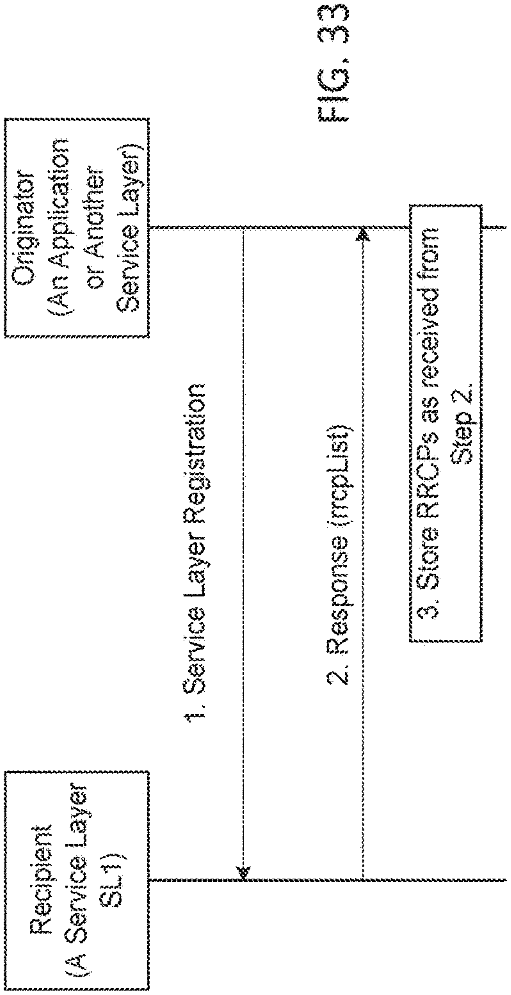
FIG. 33 is a call flow for RRCP assignment during service layer registration, in accordance with an example embodiment.

In addition, RRCPs can be assigned to an originator, for instance, when the originator registers itself with a recipient (i.e. an SL) as shown in FIG. 33, where the recipient sends a list of RRCP (i.e. their identifiers and/or their content) to the originator in the response message (i.e., Step 3) as a part of an SL registration process. If the content of the RRCP is not contained in the response message, in some examples, the recipient may additionally include a list of attributes that are not covered by RRCP and that may be sent from the originator to the recipient when the originator later needs to use the RRCP to create or update a regular resource.

In some cases, the examples described above for efficient resource representation exchange based on RRCPs can be implemented as a new RRCP CSF or as an enhanced request/response message interactions to the oneM2M functional architecture. For example, the RRCP CSF may reside in a CSE and expose its services to other CSEs and/or AEs. In an example, the RRCP CSF can automatically generate RRCPs (i.e. <rrcp>) by receiving and analyzing requests from other AEs/CSEs. For example, the RRCP CSF can also propose exiting regular resources to be used as RRCPs by receiving and analyzing requests. The RRCP CSF may expose <rrcp> resources to other AEs/CSEs. Thus, an AE/CSE can create/retrieve/update/delete a <rrcp> resource from the RRCP CSF. After a <rrcp> resource is created, an AE (or a CSE) can retrieve its representations and in turn use it to reduce the size of request or response messages. The RRCP CSF at a hosting CSE can suggest or assign existing RRCPs to an originator when the hosting CSE sends a regular response to the originator.

In some examples, the Originators descried above may be implemented by an oneM2M AE/CSE, and the Recipients (or Service Layer) described above may be implemented by an oneM2M CSE. For example, an IN-AE1 may create a <rrcpl> at an IN-CSE1. The IN-AE1 can generate optimized requests based on the <rrcpl> and send the optimized request to the IN-CSE1. Then, the IN-CSE1 may use <rrcpl> to process the received optimized request. Also, the <rrcpl> can be used by other applications such as IN-AE2 to generate optimized requests for the IN-CSE1.

An example new common attribute is described in Table 2 below.

TABLE 2

Example New Common Attribute for Supporting RRCP

| Attribute Name | Description |
|---|---|
| rrcpLinks | A resource uses this attribute to record the list of existing RRCPs, which are applicable to the resource. |

Table 3 lists example new request message parameters for CREATE, RETRIEVE, UPDATE, and DELETE operations, which can be used to support more efficient RESTful operation based on the RRCP as described herein.

TABLE 3

Summary of Example New Request Message Parameters

| Request message parameter | | Operation | | | | |
|---|---|---|---|---|---|---|
| | | Create | Retrieve | Update | Delete | Notify |
| Optional | RRCP Identifier-Indicate the identifier of a RRCP to be used for processing this request | ○ | ○ | ○ | ○ | ○ |
| | RRCP Attribute Map-Indicate which attributes in the RRCP shall be applied and/or shall not be applied. | ○ | ○ | ○ | ○ | ○ |
| | RRCP Hash-Indicate the hash of a RRCP content | ○ | ○ | ○ | ○ | ○ |
| | RRCP Target Resources-Indicate the list of regular resources that a RRCP will be applied to. | N/A | N/A | ○ | N/A | N/A |
| | Attribute Tag-Indicate the conditions or criteria for the recipient to select appropriate attributes to be sent back to the originator. For example, this parameter may indicate the last modified/retrieved time. | N/A | ○ | N/A | N/A | N/A |

TABLE 3-continued

Summary of Example New Request Message Parameters

| | Operation | | | | |
|---|---|---|---|---|---|
| Request message parameter | Create | Retrieve | Update | Delete | Notify |
| This parameter is only used for resource retrieval. | | | | | |
| Reference Resource ID Indicate an existing regular resource, which will be used by the recipient to operate the target resource (e.g., to reuse the attributes of the reference resource to create a new resource) | ○ | N/A | ○ | N/A | N/A |
| Attribute List-Indicate a list of attributes of the reference resource. This parameter shall be used together with "Reference Resource ID". If "Reference Resource ID" is not included in the request message, "Attribute List" shall not be contained in the request message either. | ○ | N/A | ○ | N/A | N/A |
| Child Resource List-Indicate a list of child resources of the reference resource. This parameter shall be used together with "Reference Resource ID". If "Reference Resource ID" is not included in the request message, "Child Resource List" shall not be contained in the request message either. | ○ | N/A | ○ | N/A | N/A |
| Reference Resource Usage-Indicate how "Attribute List" and "Child Resource List" shall be used to leverage the reference resource as denoted by "Reference Resource ID" for creating a new resource or updating a target resource. | ○ | N/A | ○ | N/A | N/A |
| Resource Num-Indicate the number of new resources to be created. | ○ | N/A | N/A | N/A | N/A |

With respect to response parameters, rrcpList is an example new response parameter, which can be included in the response message for AE or CSE registration. For example, when an AE/CSE registers to a hosting CSE, the hosting CSE will create an <AE> or a <remoteCSE> child resource under its CSEBase. In order to support the proposed rrcp assignment described herein, the hosting CSE selects appropriate RRCPs for the registered AE/CSE and include their identifiers (i.e. rrcpList parameter) in the response message. Furthermore, or alternatively, the hosting CSE can add rrcpList as a new attribute for the <AE> or <remoteCSE> resource to indicate that any RRCP included in rrcpList is applicable to and can be used by the <AE> or the <remoteCSE>.

Continuing with example response parameters, rrcpIndication and rrcpID are example new response parameters, which can be included in any response message from a CSE to an AE/CSE. The rrcpIndication may inform the recipient of the response message to create a new RRCP, and this parameter may contain required information in order to create the RRCP. In an example, the identifier of the created RRCP is set to rrcpID. Further, by including rrcpID in a response message, the originator may be informed that the resource representation should be recovered from the RRCP, as denoted by rrcpID and other attributes contained in the response message.

Turning now to example new specific attributes, rrcpList is an example new attribute for existing oneM2M resources such as <CSEBase>, <node>, <AE> and <remoteCSE>. The rrcpList may include a list of RRCP identifiers, which are applicable to and can be used by the application (as denoted by the <AE> and/or <node>) or the service layer (as denoted by the <CSEBase> and/or <remoteCSE>). This attribute may be writable.

In various examples, a new resource rrcp is used to represent a RRCP. An AE/CSE can discover and retrieve an rrcp resource. Then it can contain its identifier in a request message and, in some cases, there is no need to contain any common attributes included in the RRCP. As such, the request message size may be reduced, and in turn message overhead may be greatly decreased.

Figure 34:
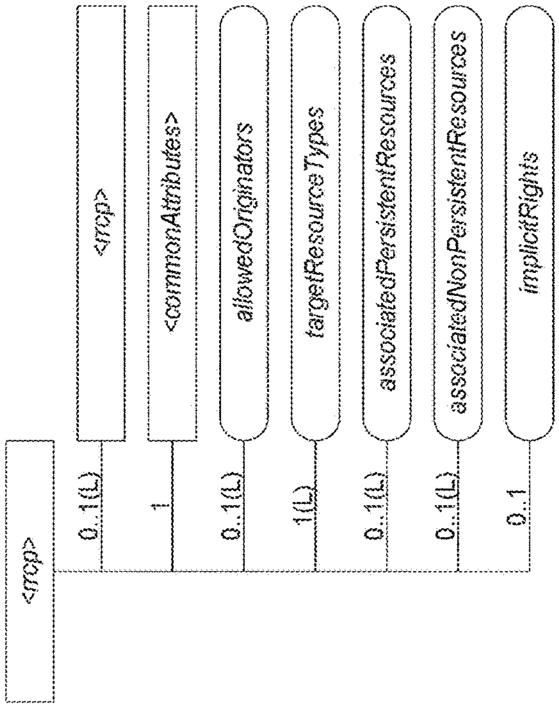
FIG. 34 depicts an example structure of an example <rrcp> resource.

An example structure of the rrcp resource is illustrated in FIG. 34. The <rrcp> resource may contain the child resources shown in Table 4 below.

TABLE 4

Example Child resources of <rrcp> resource

| Child Resources of <rrcp> | Child Resource Type | Multiplicity | Description |
|---|---|---|---|
| [variable ] | rrcp | 0 . . . 1 | A child resource used to describe another <rrcp> resource, which will be used as a part of this <rrcp>. |
| [variable ] | <commonPart> | 1 | A child resource used to describe all common attributes contained in this <rrcp> resource. Alternatively, commonPart can be just an attribute of this <rrcp>. |
| [variable] | subscription | 0 . . . n | A child resource used to make subscriptions on <rrcp > resource. |
| [variable ] | semanticDescriptor | 0 . . . n | Semantic description on <rrcp> resource. |

The <rrcp> resource may contain the attributes specified in Table 5.

TABLE 5

Example Attributes of <rrcp> resource

| Attributes of <rrcp> | Multiplicity | RW/ RO/ WO | Description | <rrcp> Attributes |
|---|---|---|---|---|
| allowedOriginators | 0 . . . 1(L) | RW | Indicates a list of requestors that can use this <rrcp>. | OA |
| targetResourceTypes | 0 . . . 1(L) | RW | Indicates a list of target resource types that this <rrcp> can be applied to. | OA |
| associatedPersistent Resources | 0 . . . 1(L) | RW | Indicates a list of regular resources that use this <rrcp> and have persistent relationship with it. | OA |
| associatedNonPersistent Resources | 0 . . . 1(L) | RW | Indicates a list of regular resources that use this <rrcp> but have non-persistent relationship with it. | OA |
| implicitRights | 0 . . . 1 | WO | If the value is set to TRUE, it indicates that any originator that uses this <rrcp> to create new regular resources can automatically have update right to <rrcp>. | OA |

Figure 35:
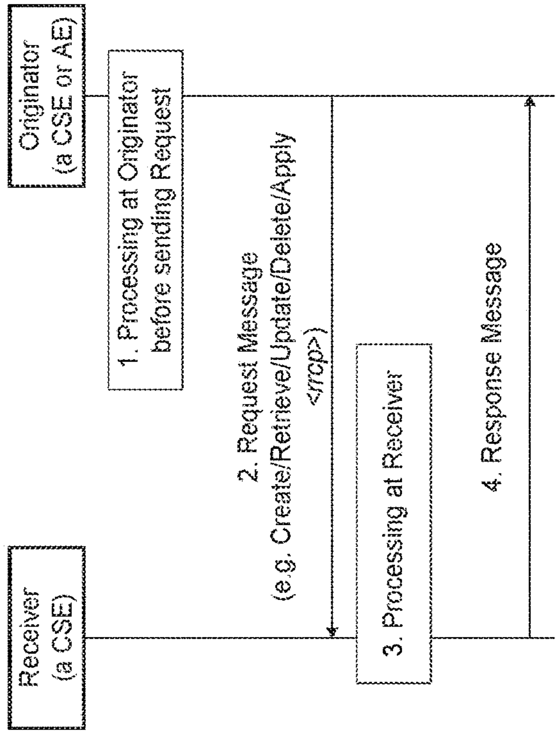
FIG. 35 is a call flow for operating the <rrcp> resource, in accordance with an example embodiment.

Referring now to FIG. 35, an example method is depicted for FIG. 35 operating a <rrcp> resource (e.g., Create/Retrieve/Update/Delete/Apply a <rrcp> resource). The Originator can be a CSE or an AE, and the Receiver can be a CSE. A create a <rrcp> procedure may be used for creating a <rrcp> resource, as described in Table 6 below.

TABLE 6

| | <rrcp> CREATE |
|---|---|
| | <rrcp> CREATE |
| Associated Reference Point | Mca, Mcc and Mcc'. |
| Information in Request message | All parameters defined in Table 8.1.2-3 in oneM2M TS-0001 apply with the specific details for:<br>Content: The resource content may provide the information about a <rrcp> resource (e.g. attribute values) as described in herein. |
| Processing at Originator before sending Request | According to clause 10.1.1.1 in oneM2M TS-0001. |
| Processing at Receiver | According to clause 10.1.1.1 in oneM2M TS-0001. |
| Information in Response message | All parameters defined in Table 8.1.3-1 in oneM2M TS-0001 may apply with the specific details for:<br>Content: Address of the created <rrcp> resource according to clause 10.1.1.1 in oneM2M TS-0001. |
| Processing at Originator after receiving Response | According to clause 10.1.1.1 in oneM2M TS-0001. |
| Exceptions | According to clause 10.1.1.1 in oneM2M TS-0001. |

A retrieve a <rrcp> procedure may be used retrieving the attributes of an existing <rrcp> resource, as described in Table 7 below.

TABLE 7

| | <rrcp> RETRIEVE |
|---|---|
| | <rrcp> RETRIEVE |
| Associated Reference Point | Mca, Mcc and Mcc'. |
| Information in Request message | All parameters defined in Table 8.1.2-3 in oneM2M TS-0001 may apply with the specific details for:<br>Content: void. |
| Processing at Originator before sending Request | According to clause 10.1.2 in oneM2M TS-0001. |
| Processing at Receiver | The Receiver may verify the existence (including Filter Criteria checking, if it is given) of the target resource or the attribute and check if the Originator has appropriate privileges to retrieve information stored in the resource/attribute. Otherwise clause 10.1.2 in oneM2M TS-0001 may apply. |
| Information in Response message | All parameters defined in Table 8.1.3-1 in oneM2M TS-0001 may apply with the specific details for:<br>Content: attributes of the <rrcp> resource as defined in herein. |
| Processing at Originator after receiving Response | According to clause 10.1.2 in oneM2M TS-0001. |
| Exceptions | According to clause 10.1.2 in oneM2M TS-0001. |

An update a <rrcp> procedure may be used to update an existing <rrcp> resource as described in Table 8 below. For example, an update may be made to its allowedOriginators attribute.

TABLE 8

| | <rrcp> UPDATE |
|---|---|
| | <rrcp> UPDATE |
| Associated Reference Point | Mca, Mcc and Mcc'. |
| Information in Request message | All parameters defined in Table 8.1.2-3 in oneM2M TS-0001 may apply with the specific details for:<br>Content: attributes of the <rrcp> resource as defined herein to be updated. |
| Processing at Originator before sending Request | According to clause 10.1.3 in oneM2M TS-0001. |
| Processing at Receiver | According to clause 10.1.3 in oneM2M TS-0001. |
| Information in Response message | According to clause 10.1.3 in oneM2M TS-0001. |
| Processing at Originator after receiving Response | According to clause 10.1.3 in oneM2M TS-0001. |

TABLE 8-continued

| | <rrcp> UPDATE |
|---|---|
| | <rrcp> UPDATE |
| Exceptions | According to clause 10.1.3 in oneM2M TS-0001. |

A delete a <rrcp> procedure may be used to delete an existing <rrcp> resource as described in Table 9 below.

TABLE 9

| | <rrcp> DELETE |
|---|---|
| | <rrcp> DELETE |
| Associated Reference Point | Mca, Mcc and Mcc'. |
| Information in Request message | All parameters defined in Table 8.1.2-3 in oneM2M TS-0001 may apply. |
| Processing at Originator before sending Request | According to clause 10.1.4.1 in oneM2M TS-0001. |
| Processing at Receiver | According to clause 10.1.4.1 in oneM2M TS-0001. |

TABLE 9-continued

| <rrcp> DELETE<br><rrcp> DELETE | |
|---|---|
| Information in Response message | According to clause 10.1.4.1 in oneM2M TS-0001. |
| Processing at Originator after receiving Response | According to clause 10.1.4.1 in oneM2M TS-0001. |
| Exceptions | According to clause 10.1.4.1 in oneM2M TS-0001. |

An apply a <rrcp> procedure may be used to apply an existing <rrcp> resource to a list of regular resources as described in Table 10. An update operation may be used to apply a <rrcp> to multiple regular resources.

TABLE 10

| <rrcp> Update<br><rrcp> Update | |
|---|---|
| Associated Reference Point | Mca, Mcc and Mcc'. |
| Information in Request message | All parameters defined in Table 8.1.2-3 in oneM2M TS-0001 may apply with a new parameter below:<br>rrcpTargetResources: the list of regular resources that this <rrcp> will be applied to. |
| Processing at Originator before sending Request | According to clause 10.1.3 in oneM2M TS-0001. |
| Processing at Receiver | The Receiver may apply the target <rrcp> to each resources as indicated in the parameter rrcpTargetResources. |
| Information in Response message | According to clause 10.1.3 in oneM2M TS-0001. |
| Processing at Originator after receiving Response | According to clause 10.1.3 in oneM2M TS-0001. |
| Exceptions | According to clause 10.1.3 in oneM2M TS-0001. |

Figure 36:
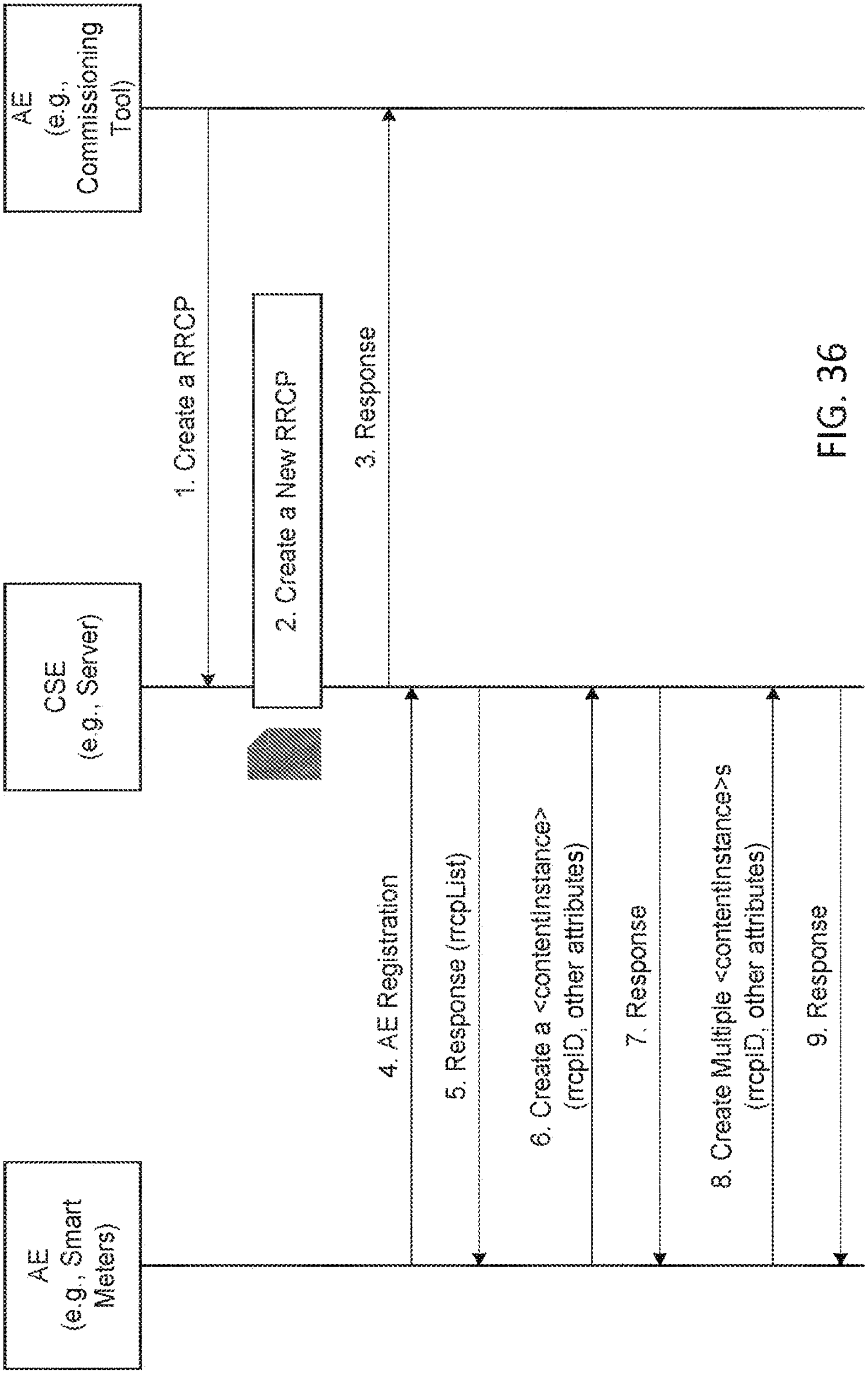
FIG. 36 is a call flow for using an RRCP in oneM2M, in accordance with an example embodiment.

Referring now to FIG. 36, an oneM2M example procedure for using RRCP is shown, where smart meters as AEs connect to a oneM2M server (i.e., CSE) via LPWAN networks. At 1, in accordance with the illustrated example, a commissioning tool as an AE requests to create a RRCP, which may be specifically for <contentInstance> resources for temperature sensors deployed in a neighborhood, for instance. The created RRCP may contain those attributes labeled with a star symbol in Table 1 herein. At 2, the CSE creates a new RRCP as requested. At 3, the CSE sends a response to the commissioning tool. At 4, a smart meter as an AE registers to the CSE. At 5, in accordance with the illustrated example, the CSE assigns the created RRCP in Step 2 to the smart meter, using the new response parameter rrcpList, which contains the identifier of the assigned RRCP. In addition to containing RRCP identifiers, the rrcpList can contain the content of each RRCP. If rrcpList does not contain the content of a RRCP, in one example (example case 1), the AE may need to perform additional steps to retrieve the content of this RRCP from the CSE. In another example (example case 2), the CSE can additionally contain a list of attributes (e.g., their names), which are not contained in the RRCP and in turn need to be submitted by the AE to the CSE, when the AE starts to use the RRCP to create a regular resource (e.g., in Step 6 and Step 8). At 6, the smart meter has a new reading and requests to create a <contentInstance> at the CSE. To reduce the size of the request message, the smart meter may use the assigned RRCP. As such, in some cases, the request message does not need to include any common attributes as contained in the RRCP. At 7, the CSE may receive the request message, use the corresponding RRCP content to recover the whole resource representation, create the <contentInstance> with the whole resource representation, and send a response back to the smart meter. At 8, the smart meter may go offline to conserve energy. After it wakes up, in an example, there may be multiple new readings to be reported to the CSE. Accordingly, the smart meter again may use the previously assigned RRCP, to create multiple <contentInstance> resources based on the same RRCP in one request message. At 9, the CSE processes the request message, creates multiple <contentInstance>s as requested, and sends a response back to the smart meter.

Figure 37:
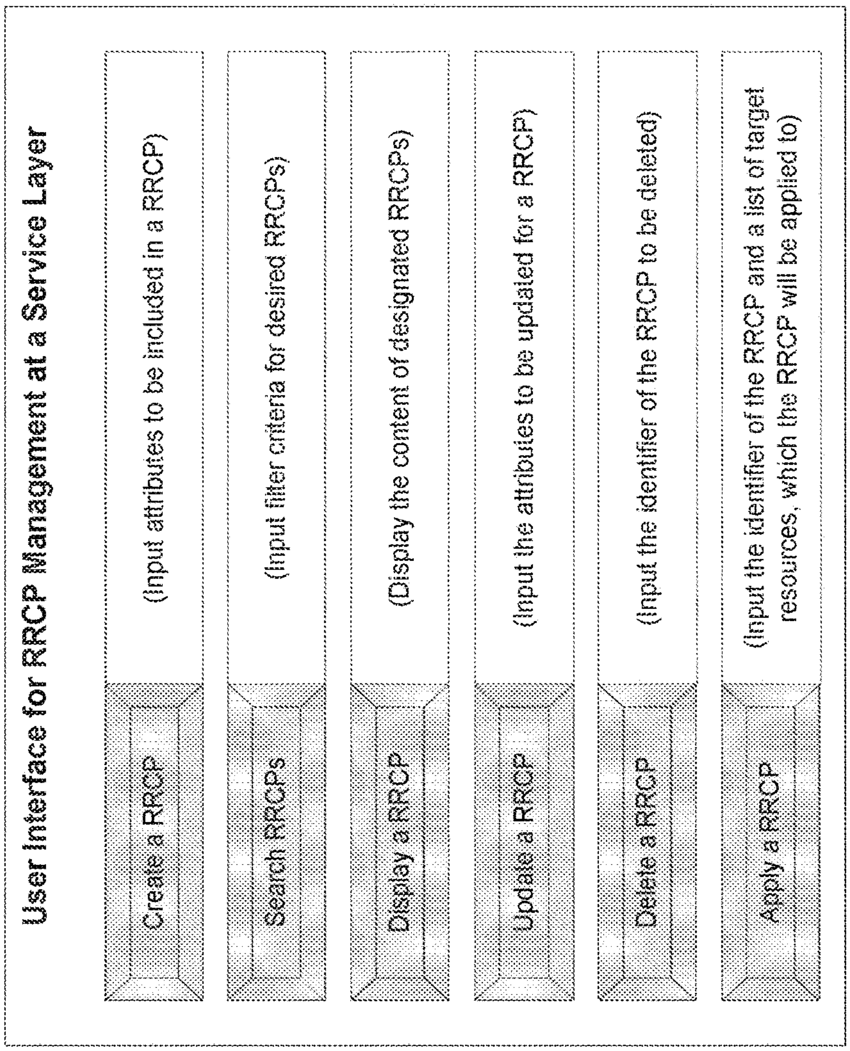
FIG. 37 is an example user interface for RRCP management at a service layer (e.g., an oneM2M CSE), in accordance with an example embodiment.

Referring now to FIG. 37, an example user interface for RRCP management at a service layer (e.g., an oneM2M CSE) is shown. The interface may allow a user or an application to initiate and perform various tasks via the CSE. Example tasks include, without limitation, creating a new RRCP, searching existing RRCPs, displaying one or more RRCPs, updating one or more RRCPs, deleting one or more RRCPs, and applying one or more RRCPs to a list of regular resources.

Figure 38A:
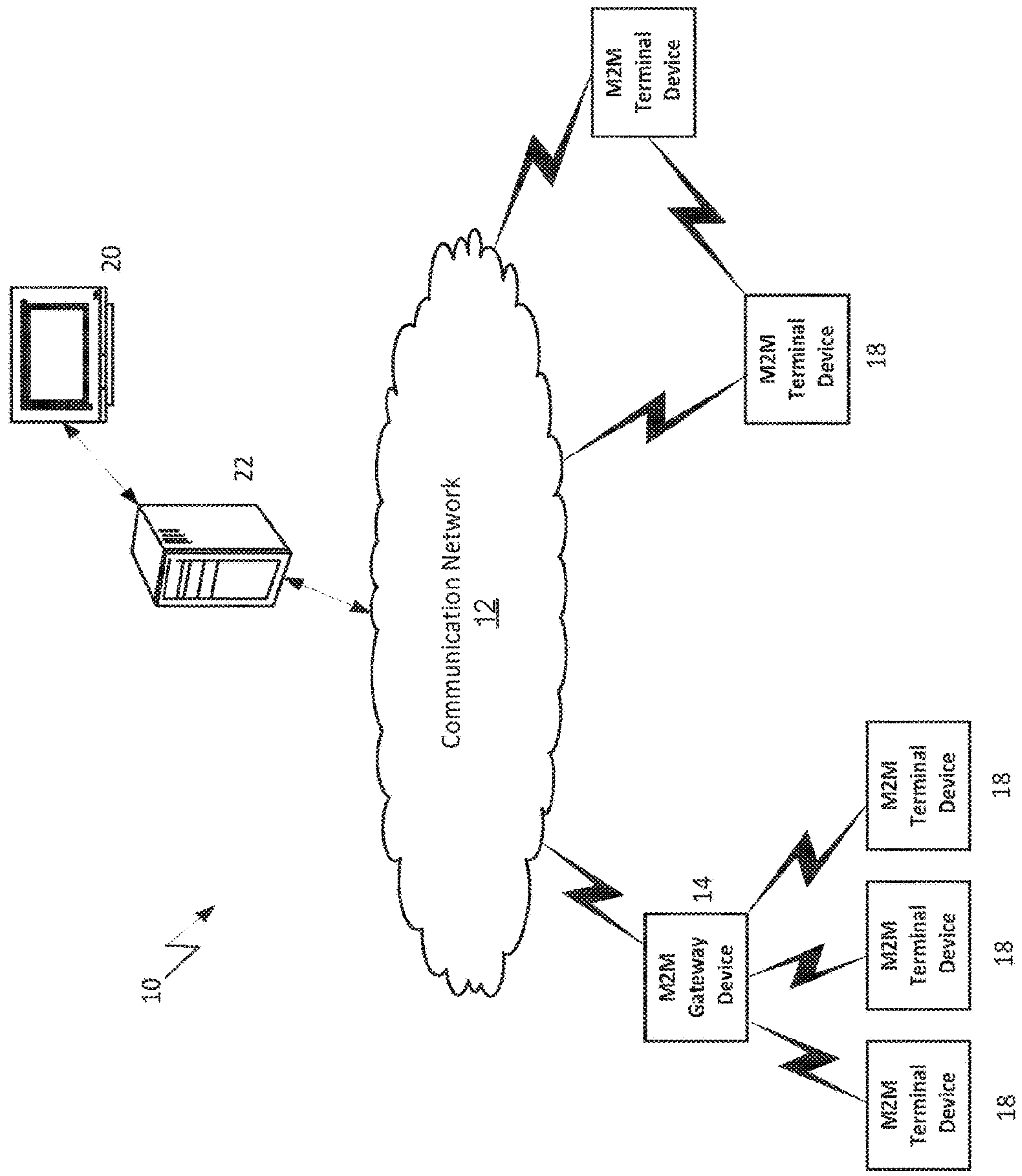
FIG. 38A is a system diagram of an example machine-to-machine (M2M), Internet of Things (IoT), or Web of Things (WoT) communication system in which one or more disclosed embodiments may be implemented.

FIG. 38A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT Service Layer, etc. Any of the client, proxy, or server devices illustrated in any of FIGS. 6-17-33, 35, and 36 may comprise a node of a communication system, such as the ones illustrated in FIGS. 38A-D.

The service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications and/or various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

As shown in FIG. 38A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 38, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different nodes (e.g., servers, gateways, device, and the like) of the network. For example, the Field Domain may include M2M gateways 14 and devices 18. It will be appreciated that any number of M2M gateway devices 14 and M2M devices 18 may be included in the M2M/IoT/WoT communication system 10 as desired. Each of the M2M gateway devices 14 and M2M devices 18 are configured to transmit and receive signals, using communications circuitry, via the communication network 12 or direct radio link. A M2M gateway 14 allows wireless M2M devices (e.g., cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or other M2M devices 18. The M2M devices 18 may also receive data from the M2M application 20 or an M2M device 18. Further, data and signals may be sent to and received from the M2M application 20 via an M2M Service Layer 22, as described below. M2M devices 18 and gateways 14 may communicate via various networks including, cellular, WLAN, WPAN (e.g., Zigbee, 6LoWPAN, Bluetooth), direct radio link, and wireline for example. Exemplary M2M devices include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Figure 38B:
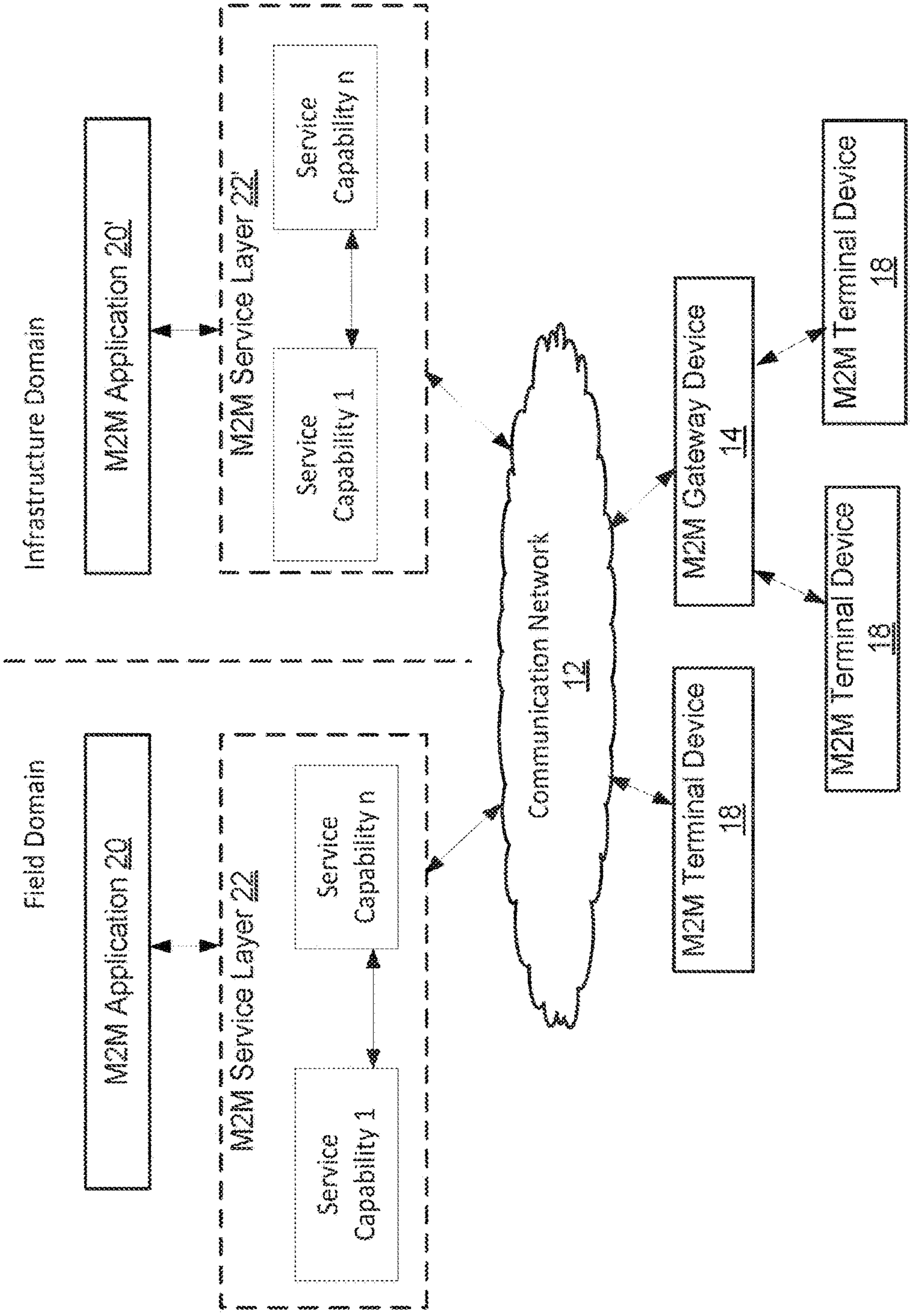
FIG. 38B is a system diagram of an example architecture that may be used within the M2M/IoT/WoT communications system illustrated in FIG. 38A.

Referring to FIG. 38B, the illustrated M2M Service Layer 22 in the field domain provides services for the M2M application 20, M2M gateways 14, and M2M devices 18 and the communication network 12. It will be understood that the M2M Service Layer 22 may communicate with any number of M2M applications, M2M gateways 14, M2M devices 18, and communication networks 12 as desired. The M2M Service Layer 22 may be implemented by one or more nodes of the network, which may comprise servers, computers, devices, or the like. The M2M Service Layer 22 provides service capabilities that apply to M2M devices 18, M2M gateways 14, and M2M applications 20. The functions of the M2M Service Layer 22 may be implemented in a variety of ways, for example as a web server, in the cellular core network, in the cloud, etc.

Similar to the illustrated M2M Service Layer 22, there is the M2M Service Layer 22' in the Infrastructure Domain. M2M Service Layer 22' provides services for the M2M application 20' and the underlying communication network 12 in the infrastructure domain. M2M Service Layer 22' also provides services for the M2M gateways 14 and M2M devices 18 in the field domain. It will be understood that the M2M Service Layer 22' may communicate with any number of M2M applications, M2M gateways and M2M devices. The M2M Service Layer 22' may interact with a Service Layer by a different service provider. The M2M Service Layer 22' may be implemented by one or more nodes of the network, which may comprise servers, computers, devices, virtual machines (e.g., cloud computing/storage farms, etc.) or the like.

Referring also to FIG. 38B, the M2M Service Layers 22 and 22' provide a core set of service delivery capabilities that diverse applications and verticals may leverage. These service capabilities enable M2M applications 20 and 20' to interact with devices and perform functions such as data collection, data analysis, device management, security, billing, service/device discovery, etc. Essentially, these service capabilities free the applications of the burden of implementing these functionalities, thus simplifying application development and reducing cost and time to market. The Service Layers 22 and 22' also enable M2M applications 20 and 20' to communicate through various networks such as network 12 in connection with the services that the Service Layers 22 and 22' provide.

The M2M applications 20 and 20' may include applications in various industries such as, without limitation, transportation, health and wellness, connected home, energy management, asset tracking, and security and surveillance. As mentioned above, the M2M Service Layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, a Service Layer, such as the Service Layers 22 and 22' illustrated in FIG. 2, defines a software middleware layer that supports value-added service capabilities through a set of Application Programming Interfaces (APIs) and underlying networking interfaces. Both the ETSI M2M and oneM2M architectures define a Service Layer. ETSI M2M's Service Layer is referred to as the Service Capability Layer (SCL). The SCL may be implemented in a variety of different nodes of the ETSI M2M architecture. For example, an instance of the Service Layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M Service Layer supports a set of Common Service Functions (CSFs) (i.e., service capabilities). An instantiation of a set of one or more particular types of CSFs is referred to as a Common Services Entity (CSE) which may be hosted on different types of network nodes (e.g., infrastructure node, middle node, application-specific node). The Third Generation Partnership Project (3GPP) has also defined an architecture for machine-type communications (MTC). In that architecture, the Service Layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the Service Layer may be implemented as a logical entity (e.g., software, computer-executable instructions, and the like) executing either on one or more standalone nodes in the network, including servers, computers, and other computing devices or nodes, or as part of one or more existing nodes. As an example, an instance of a Service Layer or component thereof may be implemented in the form of software running on a network node (e.g., server, computer, gateway, device or the like) having the general architecture illustrated in FIG. 38C or FIG. 38D described below.

Further, the methods and functionalities described herein may be implemented as part of an M2M network that uses a Service Oriented Architecture (SOA) and/or a Resource-Oriented Architecture (ROA) to access services.

Figure 38C:
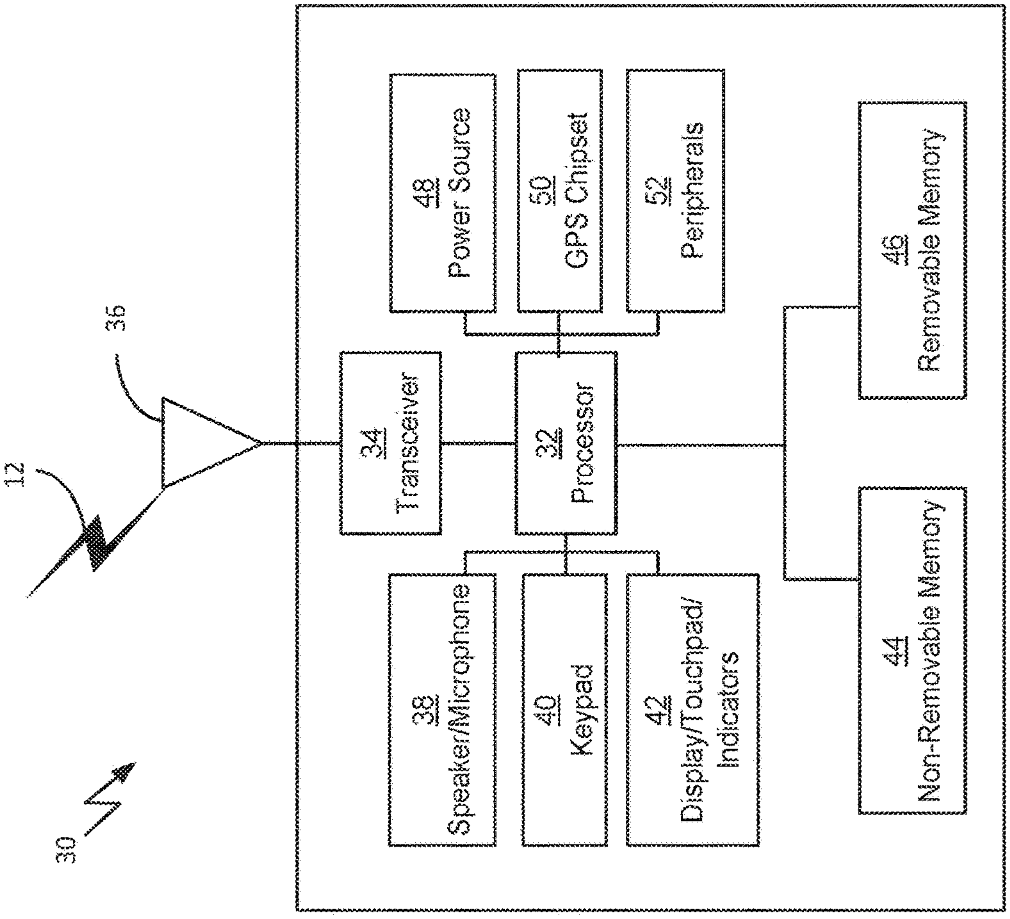
FIG. 38C is a system diagram of an example communication network node, such as an M2M/IoT/WoT device, gateway, or server that may be used within the communications system illustrated in FIGS. 38A and 38B.

FIG. 38C is a block diagram of an example hardware/software architecture of a node of a network, such as one of the entities illustrated in FIGS. 6-15, 17-33, 35, and 36, which may operate as an M2M server, gateway, device, or other node in an M2M network such as that illustrated in FIGS. 38A and 38B. As shown in FIG. 38C, the node or network apparatus 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The apparatus 30 may also include communication circuitry, such as a transceiver 34 and a transmit/receive element 36. It will be appreciated that the apparatus 30 may include any sub-combination of the foregoing elements while remaining consistent with an embodiment. This apparatus may be an apparatus that implements the resource representation capabilities and methods described herein, such as the methods described in reference to FIGS. 6-15, 17-33, 35, and 36.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASIC s), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 38C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein (e.g., in FIGS. 6-15, 17-33, and 36) and in the claims. While FIG. 38C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 38C as a single element, the apparatus 30 may include any number of transmit/receive elements 36. More specifically, the apparatus 30 may employ MIMO technology. Thus, in an embodiment, the node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple RATS, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the node 30, such as on a server or a home computer. The processor 32 may be configured to control lighting patterns, images, or colors on the display or indicators 42.

The processor 32 may receive power from the power source 48, and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the node 30. It will be appreciated that the node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., finger print) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The apparatus 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The apparatus 30 may connect to other components, modules, or systems of such apparatuses or devices via one or more interconnect interfaces, such as an interconnect interface that may comprise one of the peripherals 52.

Figure 38D:
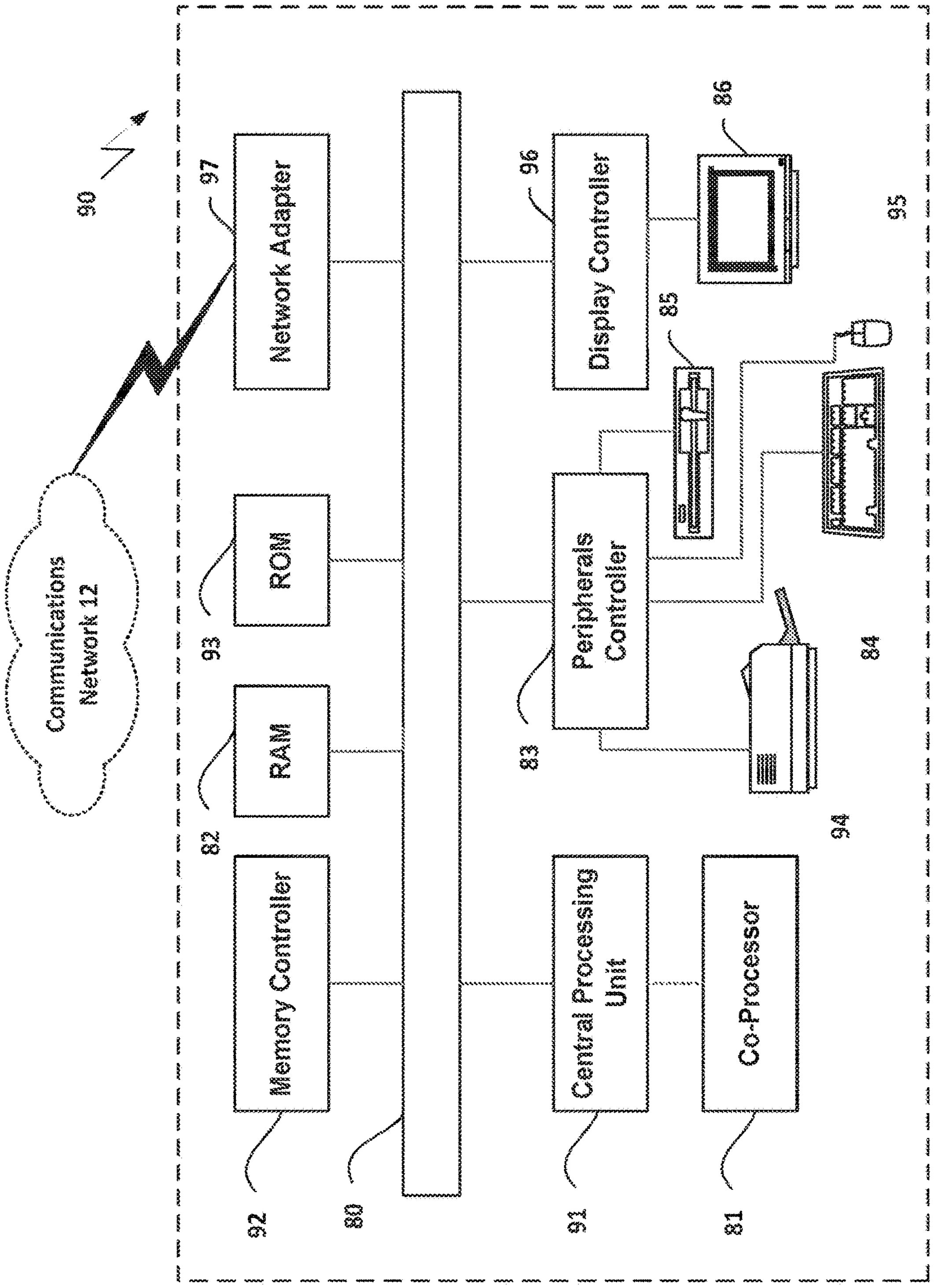
FIG. 38D is a block diagram of an example computing system in which a node of the communication system of FIGS. 38A and 38B may be embodied.

FIG. 38D is a block diagram of an exemplary computing system 90 which may also be used to implement one or more nodes or apparatuses of a network, such as the entities illustrated in FIGS. 6-15, 17-33, 35, and 36, which may operate as an M2M server, gateway, device, or other node in an M2M network such as that illustrated in FIGS. 38A and 38B.

Computing system 90 may comprise a computer or server and may be controlled primarily by computer readable instructions, which may be in the form of software, wherever, or by whatever means such software is stored or accessed. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M Service Layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIGS. 38A-D, to enable the computing system 90 to communicate with other nodes of the network. The communication circuitry, alone or in combination with the CPU 91, may be used to perform the transmitting and receiving steps described herein (e.g., in FIGS. 6-15, 17-33, 35, and 36) and in the claims.

It is understood that any or all of the systems, methods and processes described herein may be embodied in the form of computer executable instructions (i.e., program code) stored on a computer-readable storage medium which instructions, when executed by a machine, such as an apparatus of an M2M network, including for example an M2M server, gateway, device or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computer.

The following is a list of acronyms relating to service layer technologies that may appear in the above description. Unless otherwise specified, the acronyms used herein refer to the corresponding term listed below.

3GPP 3rd Generation Partnership Project
AE Application Entity
CSE Common Service Entity
CSF Common Service Function
IoT Internet of Things
M2M Machine-to-Machine
NB-IoT Narrow-Band IoT REST Resource State Transfer
UE User Equipment
URI Uniform Resource Identifier This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed:

1. An apparatus for a service supporting service capabilities through a set of Application Programming Interfaces (APIs) for a plurality of applications, the service being provided as middleware between application protocols and the plurality of applications, the apparatus comprising circuitry configured to:
- store one or more common attributes of one or more resources, so as to define one or more resource representation common parts (RRCPs), wherein the one or more common attributes comprise one or more common attribute names;
- receive, from a device or application via the service, a request message comprising information associated with a portion of a resource of the one or more resources and one or more identifiers associated with the one or more RRCPs; and
- processing the request message based on the portion of the resource and the corresponding one or more RRCPs, wherein the processing comprises adding the one or more common attribute names to the portion of the resource.

2. The apparatus of claim 1, wherein service is characterized as a service layer for IoT services, the service layer being defined according to ETSI/oneM2M standards.

3. The apparatus of claim 1, wherein the circuitry further configured to:
- create or update one or more attributes of a resource in accordance with the one or more common attributes of the one or more RRCPs.

4. The apparatus of claim 3, wherein circuitry further configured to:
- send a response to the device or application, the response indicating whether a relationship between the target resource and the one or more RRCPs is persistent or non-persistent.

5. The apparatus of claim 1, wherein processing the request message comprises forwarding the request message to another entity in the service.

6. The apparatus of claim 1, wherein the request message further comprises an attribute tag that indicates one or more conditions for retrieving the one or more common attributes of the one or more RRCPs.

7. The apparatus of claim 1, wherein circuitry further configured to:
- receive a second request message to create a new RRCP comprising one or more values of one or more attributes;
- create the new RRCP, the new RRCP comprising the one or more values;
- generate an identifier associated with the new RRCP;
- store, in the memory, the new RRCP and the identifier associated with the new RRCP; and
- send a response to the second request message to create the new RRCP, the response comprising the identifier associated with the new RRCP.

8. The apparatus of claim 1, wherein circuitry further configured to:
- determine to create a new RRCP; and
- determine one or more attribute values to be included in the new RRCP.

9. The apparatus of claim 8, wherein the determination to create the new RRCP is based on messages received by the service from devices.

10. The apparatus of claim 1, wherein the request message is a resource creation, update, retrieval, or deletion request.

11. A method performed by a service supporting service capabilities through a set of Application Programming Interfaces (APIs) for a plurality of applications, the service being provided as middleware between application protocols and the plurality of applications, the method comprising:
- storing one or more common attributes of one or more resources, so as to define one or more resource representation common parts (RRCPs), wherein the one or more common attributes comprise one or more common attribute names;
- receive, from a device or application via the service, a request message comprising information associated with a portion of a resource of the one or more resources and one or more identifiers associated with the one or more RRCPs; and
- processing the request message based on the portion of the resource and the corresponding one or more RRCPs, wherein the processing comprises adding the one or more common attribute names to the portion of the resource.

12. The method of claim 11, wherein service is characterized as a service layer for IoT services, the service layer being defined according to ETSI/oneM2M standards.

13. The method of claim 11, the method further comprising:
- creating or updating one or more attributes of a target resource in accordance with the one or more common parts of attributes of the one or more RRCPs.

14. The method of claim 13, the method further comprising:
- sending a response to the device or application, the response indicating whether a relationship between the target resource and the one or more RRCPs is persistent or non-persistent.

15. The method of claim 11, wherein processing the request message comprises forwarding the request message to another entity in the service.

16. The method of claim 11, wherein the request message further comprises an attribute tag that indicates one or more conditions for retrieving the one or more common attributes of the one or more RRCPs.

17. The method of claim 11, the method further comprising:
- receiving a second request message to create a new RRCP comprising one or more values of one or more attributes;
- creating the new RRCP, the new RRCP comprising the one or more values;
- generating an identifier associated with the new RRCP;
- storing, in the memory, the new RRCP and the identifier associated with the new RRCP; and sending a response to the second request message to create the new RRCP, the response comprising the identifier associated with the new RRCP.

18. The method of claim 11, the method further comprising:

determining to create a new RRCP; and determining one or more attribute values to be included in the new RRCP.

19. The method of claim 18, wherein the determination to create the new RRCP is based on messages received by the service layer from devices on the communications network.

20. The method of claim 11, wherein the request message is a resource creation, update, retrieval, or deletion request.

* * * * *